(12) United States Patent
Ramakrishnan et al.

(10) Patent No.: US 12,250,418 B2
(45) Date of Patent: *Mar. 11, 2025

(54) SYSTEMS AND METHODS FOR MANAGING RECORDED MEDIA ASSETS THROUGH ADVERTISEMENT INSERTION

(71) Applicant: Adeia Guides Inc., San Jose, CA (US)

(72) Inventors: Parasuraman Ramakrishnan, Boston, MA (US); Michael A. Montalto, South Hamilton, MA (US); Pok-Ching Lee, Boston, MA (US); Wendy Cheang, Charlestown, MA (US)

(73) Assignee: Adeia Guides Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/750,258

(22) Filed: Jan. 23, 2020

(65) Prior Publication Data

US 2020/0169769 A1 May 28, 2020

Related U.S. Application Data

(63) Continuation of application No. 15/903,401, filed on Feb. 23, 2018, now Pat. No. 10,582,229.

(51) Int. Cl.
*H04N 21/234* (2011.01)
*G06F 16/41* (2019.01)
(Continued)

(52) U.S. Cl.
CPC ....... *H04N 21/23424* (2013.01); *G06F 16/41* (2019.01); *G06F 16/489* (2019.01); *G06Q 30/0255* (2013.01); *H04N 21/4312* (2013.01); *H04N 21/4532* (2013.01); *H04N 21/4788* (2013.01); *H04N 21/4821* (2013.01); *H04N 21/4854* (2013.01); *H04N 21/812* (2013.01)

(58) Field of Classification Search
CPC ......... H04N 21/23424; H04N 21/4312; H04N 21/4532; H04N 21/4788; H04N 21/4821; H04N 21/4854; H04N 21/812; G06F 16/489; G06F 16/41; G06Q 30/0255
See application file for complete search history.

(56) References Cited

U.S. PATENT DOCUMENTS

| | | | | |
|---|---|---|---|---|
| 7,966,218 B1 * | 6/2011 | Fish | ................... | H04N 21/4147 705/14.68 |
| 8,719,891 B1 * | 5/2014 | Aldrey | ............. | H04N 21/25866 725/132 |

(Continued)

*Primary Examiner* — Randy A Flynn
(74) *Attorney, Agent, or Firm* — Haley Guiliano LLP

(57) ABSTRACT

Systems and methods are disclosed herein for managing recorded media assets through advertisement insertion. A media guidance application may record and store media assets for later viewing by a user. To help ensure that the user views older recordings first, the media guidance application may insert advertisements into media assets which are part of a program series where there are older recorded media assets of the same program series that have not yet been watched by the user. The media guidance application may determine that multiple media assets are part of the same program series, and which of the media assets was recorded latest. The media guidance application may then select a play position within the later-recorded media asset and insert an advertisement at the selected play position.

18 Claims, 10 Drawing Sheets

(51) Int. Cl.
*G06F 16/48* (2019.01)
*G06Q 30/0251* (2023.01)
*H04N 21/431* (2011.01)
*H04N 21/45* (2011.01)
*H04N 21/4788* (2011.01)
*H04N 21/482* (2011.01)
*H04N 21/485* (2011.01)
*H04N 21/81* (2011.01)

(56) References Cited

U.S. PATENT DOCUMENTS

| | | | | |
|---|---|---|---|---|
| 2003/0058707 A1* | 3/2003 | Dilger | .................. | H04N 21/458 365/200 |
| 2003/0091235 A1* | 5/2003 | Xiong | .................. | G06F 16/785 382/199 |
| 2003/0190150 A1* | 10/2003 | Kawasaki | .......... | H04N 21/4316 386/243 |
| 2004/0083484 A1* | 4/2004 | Annon Ryal | ........ | H04N 21/812 725/1 |
| 2008/0114861 A1* | 5/2008 | Gildred | ............ | H04N 21/44016 709/219 |
| 2009/0080698 A1* | 3/2009 | Mihara | .............. | G06F 16/7328 382/103 |
| 2009/0293089 A1* | 11/2009 | Taylor | ................ | H04N 21/4583 725/53 |
| 2010/0303447 A1* | 12/2010 | Niemeijer | .......... | H04N 21/4331 386/250 |
| 2011/0061072 A1* | 3/2011 | Setos | ................ | H04N 21/2387 725/32 |
| 2011/0142417 A1* | 6/2011 | Wilson | ............... | H04N 21/4408 386/250 |
| 2011/0197224 A1* | 8/2011 | Meijer | ............... | H04N 21/4755 725/34 |
| 2012/0020647 A1* | 1/2012 | Vogel | .................. | H04N 21/812 386/251 |
| 2012/0240177 A1* | 9/2012 | Rose | .................. | H04N 21/4532 725/116 |
| 2012/0253937 A1* | 10/2012 | Wing | .................. | H04N 21/2547 705/14.58 |
| 2013/0014136 A1* | 1/2013 | Bhatia | ................ | H04N 21/4222 725/9 |
| 2013/0219424 A1* | 8/2013 | Lechner | ............ | H04N 21/4325 725/32 |
| 2014/0150016 A1* | 5/2014 | Feng | ................ | H04N 21/25883 725/34 |
| 2014/0226949 A1* | 8/2014 | Onishi | ............... | H04N 21/8547 386/201 |
| 2015/0281635 A1* | 10/2015 | Tang | .................. | H04N 21/2747 386/295 |
| 2017/0118533 A1* | 4/2017 | Holtz | .................. | H04N 21/252 |

\* cited by examiner

| The Magicians | "The Losses of Magic" (s03e03) | January 24, 2017 |
| --- | --- | --- |
| The Big Bang Theory 112 ADS | "The Separtion Triangulation" (s11e14) | January 18, 2018 |
| Knightfall | "And Certainly Not the Cripple" (s01e07) | January 17, 2018 |
| The Late Show with Stephen Colbert | "Jon Bon Jovi; Daniel Kaluuya; Ben Sinclair" (s03e71) | January 16, 2018 |
| The Big Bang Theory | "The Solo Oscillation" (s11e13) | January 11, 2018 |
| Knightfall | "The Pilgrimage of Chains" (s01e06) | January 10, 2018 |

(OK) - Playback     (Info) - More information     (Exit) - Back to Live TV

FIG. 1

SYSTEMS AND METHODS FOR MANAGING RECORDED MEDIA ASSETS THROUGH ADVERTISEMENT INSERTION

CROSS-REFERENCE TO RELATED APPLICATION

This patent application is a continuation of U.S. patent application Ser. No. 15/903,401, filed Feb. 23, 2018, the disclosure of which is hereby incorporated by reference herein in its entirety.

BACKGROUND

There are many television programs available to users, resulting in the need to record programs for later viewing. At times, a number of episodes of the same television series may be recorded. This may result in users watching episodes out of order, sometimes spoiling events from earlier episodes which the user may not yet have watched. Additionally, users may watch more recent episodes first, while older episodes may be automatically deleted due to a retention policy, resulting in the user's inability to watch the older episodes. Conventional systems sort episodes chronologically to encourage the user to watch the oldest recorded programs first. But typically, users still choose to watch the most recent recordings first and may not ever get to watch the older recordings before they get deleted.

SUMMARY

Accordingly, systems and methods are described herein for a media guidance application that inserts advertisements into recorded media assets representing newer episodes of a television program series, thereby enticing the user to watch older episodes first. The media guidance application may determine that recorded media assets are part of the same series and further determine when each media asset was recorded. The media guidance application may then insert advertisements into the media asset that was recorded most recently.

As an example, a user may schedule recordings of the program series "The Big Bang Theory". The media guidance application may record and store each new episode of the program series. The user may access a list of recorded media assets and choose a media asset to play back. The media guidance application, after recording a media asset, may determine that there are recorded media assets representing older episodes of "The Big Bang Theory" that have not yet been watched. The media guidance application may determine when each of the media assets was recorded, select a play position within the newest media asset, and insert an advertisement at the selected play position. The media guidance application may prevent a user from skipping or fast-forwarding through the inserted advertisement.

In some aspects, the media guidance application may store, in a storage device, a first media asset at a first date and time, and a second media asset at a second date and time. For example, the media guidance application may record an episode of the program series "The Big Bang Theory" on Jan. 11, 2018, and record another episode of the same program series on Jan. 18, 2018.

The media guidance application may determine that the first media asset and the second media asset are part of a program series. For example, the media guidance application may compare metadata of the episodes of "The Big Bang Theory" recorded on January 11 and January 18 and determine that the metadata relating to the program series are identical for both media assets.

The media guidance application may access metadata related to media assets stored in the storage device. For example, the media guidance application may store a record, listing, or database of information describing each recorded media asset stored in a storage device of the media device on which the media guidance application resides. The media guidance application may determine, based on the metadata, ages of the first media asset and the second media asset, wherein the age of the first media asset represents the first date and time at which the first media asset was stored, and the age of the second media asset represents the second date and time at which the second media asset was stored. For example, the media guidance application may determine that one episode of "The Big Bang Theory" was recorded on January 11, and the other was recorded on January 18. The media guidance application may compare the date of the recording with the current date to determine the age, for example, 21 days and 14 days, respectively, of each of the media assets.

The media guidance application may compare the age of the first media asset with the age of the second media asset to determine which of the first date and time and the second date and time represents a later date and time. For example, the media guidance application may compare the 21-day age of one episode of "The Big Bang Theory" with the 14-day age of another episode of the same series to determine the relative age of the two media assets.

In response to determining that the age of the first media asset indicates that the first media asset was stored at a later date and time than the second media asset, the media guidance application may process the first media asset to identify a plurality of play positions within the first media asset corresponding to boundaries between discrete scenes of the first media asset. For example, the media guidance application may access the video data of the newer media asset and analyze the data through image processing to identify the first and last frame of each scene in the media asset. The media guidance application may select a play position of the plurality of play positions. For example, the media guidance application may select a play position corresponding to the last frame of a scene. The media guidance application may select a scene at random, or may select a scene of relative importance. For example, the media guidance application may access a database or metadata indicating the content of each scene and/or the relative importance of each scene in the media asset. The media guidance application may access a database of advertisements. For example, the media guidance application may communicate with a remote server to request an advertisement, or may access a locally-stored database of advertisements, stored in a storage device of the media device on which the media guidance application resides. The media guidance application may select an advertisement from the database of advertisements having a duration. For example, the media guidance application may request an advertisement from the remote server, or may retrieve an advertisement from the locally-stored database of advertisements. The advertisement may be a certain amount of time in length. The media guidance application may shift media data of the first media asset located after the selected play position to a later play position having a temporal distance corresponding to the duration of the selected advertisement. For example, the media guidance application may modify the length of the media asset by adding the length of time of the selected advertisement to the media asset. The media guidance application may then insert the selected advertisement into the first media asset at the selected play position.

In some embodiments, the media guidance application may compare the ages of the first media asset and the second media asset with a threshold age. For example, the threshold age may be fifteen days. The media guidance application may compare the 14-day age of one episode of "The Big Bang Theory" with the threshold. If the age of the first media asset does not exceed the threshold age, the media guidance application may not insert advertisement into the first media asset, even if another media asset of the same program series and having an age that is newer than the age of the first media asset.

In some embodiments, the media guidance application may generate for display a list of media assets stored in the storage device. For example, the media guidance application may generate for display a user interface screen which lists the recorded media assets available for play back. The media guidance application may modify an appearance of a listing corresponding to the first media asset to indicate that the selected advertisement was inserted into the first media asset. For example, the media guidance application may alter the background color or text color of a listing or may display an icon or other visual indication to notify a user that advertisements have been inserted into the listed media asset.

In some embodiments, the media guidance application determines that the first media asset and the second media asset are part of a program series by retrieving a first program series identifier of the first media asset and a second media asset. For example, the media guidance application may access metadata or other data related to recorded media assets and extract data identifying the program series of which each media asset is a part. The media guidance application may compare the first program series identifier and the second program series identifier to determine if the first media asset and the second media asset are part of the same program series. For example, the media guidance application may compare the program series information of the episodes of "The Big Bang Theory" and determine that they are identical strings. Based on this determination, the media guidance application may determine that the two episodes are part of the same program series.

In some embodiments, the media guidance application may process the first media asset to identify a plurality of play positions within the first media asset corresponding to boundaries between discrete scenes of the first media asset by processing adjacent frames of the first media asset to identify, using image processing, a first set of image properties of one frame and a second set of image properties of an adjacent frame, wherein the image properties comprise brightness, hue, and saturation, and identify, using edge detection, a first set of objects displayed in one frame, and a second set of objects in the adjacent frame. For example, the media guidance application may analyze each frame of the video data of the media asset using image processing to determine the objects represented in the frame, and the color of each object. The media guidance application may compare the first set of image properties and first set of objects with the second set of image properties and the second set of objects to determine a degree of change between the first frame and the second frame, wherein a high degree of change indicates that the first frame and the second frame contain at least one of different colors and different objects, and a low degree of change indicates that the first frame and the second frame contain similar colors and similar objects. For example, a frame with the same or similar colors as the previous frame, and the same or similar objects as the previous frame has a low degree of change, while a frame with different colors than the previous frame, and different objects than the previous frame has a high degree of change. The media guidance application may determine, based on the degree of change, that the second frame represents a different scene of the media asset than the first frame.

In some embodiments, the media guidance application may select an advertisement from the database of advertisements by retrieving, from a user profile associated with a user of the media device, identifications of a plurality of media assets viewed by the user. For example, the media guidance application may access a history of media assets watched by the user from a user profile. The media guidance application may determine, based on the user profile, a type of advertisement corresponding to at least one media asset of the plurality of media assets view by the user. For example, based on the user's history of watching "The Big Bang Theory", the media guidance application may identify the type of advertisement as advertisements for sitcoms. The media guidance application may retrieve from the database of advertisements a list of advertisements of the determined type and selecting an advertisement from the list of advertisements. For example, the media guidance application may retrieve a list of advertisements for other sitcoms and select an advertisement for "The IT Crowd".

In some embodiments, the media guidance application may select an advertisement from the database of advertisements by determining a social network associated with a user of the media device. For example, the media guidance application may determine from a user profile that the user has a Facebook® account. The media guidance application may access the social network and determine, based on social network activity of the user, a type of advertisement corresponding to the social network activity of the user. For example, the media guidance application may access the user's Facebook® account, or receive a feed or summary of the user's Facebook® activity, including items and messages published and received by the user. The media guidance application may search the user's activity for terms relating to specific media assets, program series, genres, or products. Based on results of the search, the media guidance application may determine, for example, that the user is interested in a specific product. The media guidance application may retrieve from the database of advertisements a list of advertisement of the determined type and selecting an advertisement from the list of advertisements. For example, the media guidance application may retrieve a list of advertisements for the specific product and similar products and select one of the advertisements from the list.

In some embodiments, the media guidance application may insert the selected advertisement into the first media asset at the selected play position by retrieving media data of the selected advertisement and inserting the media data of the selected advertisement into media data of the first media asset at the selected play position. For example, the media guidance application may retrieve the video and audio data corresponding to the selected advertisement. The media guidance application may copy the video and audio data into the media asset at the selected play position.

In some embodiments, the media guidance application may insert the selected advertisement into the first media asset by retrieving a pointer to the selected advertisement from the database. For example, the media guidance application may retrieve a URL or other resource locator identifying a specific location from which the selected advertisement can be accessed. The media guidance application may insert the pointer into the first media asset at the selected play position. During playback of the media asset, the pointer may cause the media guidance application to retrieve the selected advertisement from the database, pause playback of the first media asset at the selected play position, begin playback of the selected advertisement, and in response to completing playback of the selected advertisement, resuming playback of the first media asset at the selected play position. For example, upon reaching the pointer, the media guidance application may pause playback of the media asset, and download or stream the advertisement from the database. After playback of the advertisement has finished, the media guidance application may resume playing the media asset from the point at which playback was paused.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows an exemplary display screen listing recorded media assets according to an embodiment of the disclosure;

DETAILED DESCRIPTION

Figure 2:
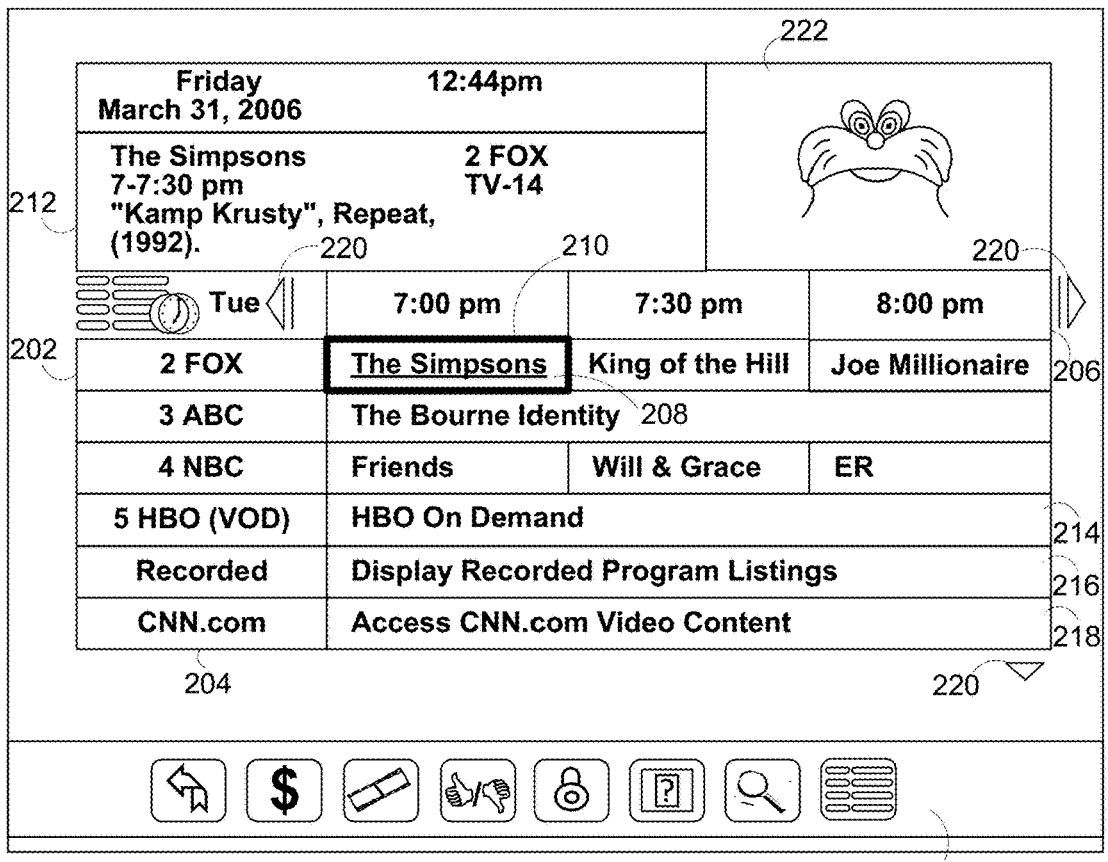
FIG. 2 shows an illustrative display screen that may be used to provide media guidance data according to an embodiment of the disclosure.

Systems and methods are described herein for a media guidance application that inserts advertisements into recorded media assets representing newer episodes of a television program series, thereby enticing the user to watch older episodes first. The media guidance application may determine that recorded media assets are part of the same series and further determine when each media asset was recorded. The media guidance application may then insert advertisements into the media asset that was recorded most recently.

As an example, a user may schedule recordings of the program series "The Big Bang Theory". The media guidance application may record and store each new episode of the program series. The user may access a list of recorded media assets and choose a media asset to play back. The media guidance application, after recording a media asset, may determine that there are recorded media assets representing older episodes of "The Big Bang Theory" that have not yet been watched. The media guidance application may determine when each of the media assets was recorded, select a play position within the newest media asset and insert an advertisement at the selected play position.

FIG. 1 shows an exemplary display screen 100 listing recorded media assets according to an embodiment of the disclosure. Display screen 100 displays recorded media asset list 102. The media guidance application may be configured to store, in a storage device, recordings of media assets broadcast as certain dates and times. For example, the media guidance application may record an episode of the program series "The Big Bang Theory" on Jan. 11, 2018, and record another episode of the same program series on Jan. 18, 2018. These recorded media assets may be displayed in recorded media asset list 102. Listing 104 represents a recording of an episode of "The Big Bang Theory" recorded on Jan. 18, 2018. Listing 108 represents a recording of an episode of "The Big Bang Theory" recorded on Jan. 11, 2018. The user may schedule recordings of other program series as well. For example, listing 106 represents a recording of an episode of "Knightfall" recorded on Jan. 17, 2018, and listing 110 represents a recording of an episode of "Knightfall" recorded on Jan. 10, 2018.

The media guidance application may be configured to determine that recorded media assets are part of a program series. For example, the media guidance application may compare metadata of the episodes of "The Big Bang Theory" recorded on Jan. 11, 2018 and Jan. 18, 2018 and determine that the metadata relating to the program series are identical for both media assets. For example, the media guidance application may use a string comparator, mathematical comparator, or other logical comparator to determine if the program series identified by the metadata of each media asset is the same. Some media assets may identify the program series of which they are a part by an identification code, such as a decimal or hexadecimal number. Other media assets may identify the program series by an alphanumeric string representing the title of the program series, such as "The Big Bang Theory". When comparing the program series identifiers of a media asset which uses an identification code with the program series identifier of a media asset which uses an alphanumeric string, the media guidance application may use electronic program guide data or may access a remote media guidance data source to determine the title of the program series which corresponds to the identification code. The program series identifiers may then be compared to determine if the media assets are of the same program series.

The media guidance application may be configured to access metadata related to media assets stored in the storage device. For example, the media guidance application may store a record, listing, or database of information describing each recorded media asset stored in a storage device of the media device on which the media guidance application resides. The information may include metadata from an electronic program guide listing, as well as information generated by the media guidance application for use by the file system of the media device on which the media guidance application resides. The media guidance application may be configured to determine, based on the metadata, ages of the first media asset and the second media asset. The age of the first media asset represents the first date and time at which the first media asset was stored. For example, the first media asset may be the episode of "Knightfall" represented by listing 106, and the age of the first media asset may represent the recording date of Jan. 17, 2018. The age of the second media asset represents the second date and time at which the second media asset was stored. For example, the second media asset may be the episode of "Knightfall" represented by listing 110, and the age of the second media asset may represent the recording date of Jan. 10, 2018. The media guidance application may be configured to compare the date of the recording with the current date to determine the age. For example, if the current date is Jan. 31, 2018, the ages of the first and second media asset may be 21 days and 14 days, respectively.

The media guidance application may be configured to compare the age of the first media asset with the age of the second media asset to determine which of the first date and time and the second date and time represents a later date and time. For example, the media guidance application may compare the 21-day age of one episode of "Knightfall" with the 14-day age of another episode of the same series to determine the relative age of the two media assets. Alternatively, the media guidance application may be configured to compare the age of each media asset to the current date. As yet another alternative, the media guidance application may use simple mathematical comparisons to determine which media asset was recorded on a later date.

In response to determining that the age of the first media asset indicates that the first media asset was stored at a later date and time than the second media asset, the media guidance application may be configured to process the first media asset to identify a plurality of play positions within the first media asset corresponding to boundaries between discrete scenes of the first media asset. For example, the media guidance application may access the video data of the newer media asset and analyze the data through image processing to identify the first and last frame of each scene in the media asset. For example, the media guidance application may detect a fade-out over a series of frames, followed immediately by a fade-in. The media guidance application may determine that the frame with the darkest color balance during the fade-out/fade-in sequence is the last frame of a scene. As another example, the media guidance application may detect "jump cuts", in which the last frame of a scene is followed immediately by the first frame of another with no transition. The media guidance application may also be configured to access metadata related to the media asset, such as a table of contents or other scene listing, to determine the boundaries between scenes. The media guidance application may be configured to select a play position of the plurality of play positions. For example, the media guidance application may select a play position corresponding to the last frame of a scene. The media guidance application may select a scene at random. Alternatively, the media guidance application may select a scene according to a fixed pattern. For example, the media guidance application may select the first scene of the media asset, followed by the scene that is temporally closest to the middle of the media asset, and the last scene of the media asset. As yet another alternative, the media guidance application may select a scene of relative importance. For example, the media guidance application may access a database or metadata indicating the content of each scene and/or the relative importance of each scene in the media asset.

The media guidance application may be configured to access a database of advertisements. For example, the media guidance application may communicate with a remote server to request an advertisement, or may access a locally-stored database of advertisements, stored in a storage device of the media device on which the media guidance application resides. The media guidance application may be configured to select an advertisement from the database of advertisements having a duration. For example, the media guidance application may request an advertisement from the remote server, or may retrieve an advertisement from the locally-stored database of advertisements. The advertisement may be a certain amount of time in length. The media guidance application may be configured to shift media data of the first media asset located after the selected play position to a later play position having a temporal distance corresponding to the duration of the selected advertisement. For example, the media guidance application may modify the length of the media asset by adding the length of time of the selected advertisement to the media asset. The media guidance application may then adjust the temporal position of all media data after the selected play position to create a temporal space between the selected play position and the subsequent media data that is equal in length to the length of the selected advertisement. The media guidance application may insert the selected advertisement into the first media asset at the selected play position, filling the temporal space.

In some embodiments, the media guidance application may be configured to generate for display a list of media assets stored in the storage device. For example, the media guidance application may generate for display a user interface screen (e.g., display screen 100) which lists the recorded media assets available for play back (e.g., recorded media asset list 102). The media guidance application may be configured to modify an appearance of a listing corresponding to the first media asset to indicate that the selected advertisement was inserted into the first media asset. For example, the media guidance application may alter the background color or text color of a listing, such as in listing 106. Alternatively, the media guidance application may display an icon or other visual indication to notify a user that advertisements have been inserted into the listed media asset, such as in listing 104.

In some embodiments, the media guidance application may be configured to determine that the first media asset and the second media asset are part of a program series by retrieving a first program series identifier of the first media asset and a second media asset from metadata generated by the media guidance application at the time of recording of each media asset. For example, the media guidance application may access metadata or other data generated by the media guidance application for use in media asset management related to recorded media assets and extract data identifying the program series of which each media asset is a part. The media guidance application may compare the first program series identifier and the second program series identifier to determine if the first media asset and the second media asset are part of the same program series. For example, the media guidance application may use a string comparator, mathematical comparator, or other logical comparator to determine if the program series identified by the metadata of each media asset is the same. Some media assets may identify the program series by an identification code, such as a decimal or hexadecimal number, while some media assets may identify the program series by an alphanumeric string representing the title of the program series, such as "The Big Bang Theory". When comparing the program series identifiers of a media asset which uses an identification code with the program series identifier of a media asset which uses an alphanumeric string, the media guidance application may use electronic program guide data or may access a remote media guidance data source to determine the title of the program series which corresponds to the identification code.

In some embodiments, the media guidance application may be configured to process the first media asset to identify a plurality of play positions within the first media asset corresponding to boundaries between discrete scenes of the first media asset by processing adjacent frames of the first media asset to identify, using image processing, a first set of image properties of one frame and a second set of image properties of an adjacent frame, wherein the image properties comprise brightness, hue, and saturation, and identify, using edge detection, a first set of objects displayed in one frame, and a second set of objects in the adjacent frame. For example, the media guidance application may analyze each frame of the video data of the media asset using image processing and edge detection techniques to determine the objects represented in the frame, and the color of each object. The media guidance application may compare the first set of image properties and first set of objects with the second set of image properties and the second set of objects to determine a degree of change between the first frame and the second frame, wherein a high degree of change indicates that the first frame and the second frame contain at least one of different colors and different objects, and a low degree of change indicates that the first frame and the second frame contain similar colors and similar objects. For example, a frame with the same or similar colors as the previous frame, and the same or similar objects as the previous frame has a low degree of change, while a frame with different colors than the previous frame, and different objects than the previous frame has a high degree of change. Alternatively or additionally, the media guidance application may analyze audio data to determine if an individual person's voice continues to be present across play positions indicated by the video data to be scene boundaries. For example, a scene in which two characters carry out a conversation may comprise a series of jump cuts between a camera angle focusing on one individual and a camera angle focusing on the other individual. While analysis of video data may result in each of the jump cuts being marked as a scene boundary, analysis of audio data may show that, despite the abrupt changes in video data, the audio data is consistent across the frames and therefore constitute a continuous scene, lowering the degree of change between the frames. The media guidance application may be configured to determine, based on the degree of change, that the second frame represents a different scene of the media asset than the first frame.

In some embodiments, the media guidance application may be configured to select an advertisement from the database of advertisements by retrieving, from a user profile associated with a user of the media device, identifications of a plurality of media assets viewed by the user. For example, the media guidance application may track media assets watched by the user and store information in a local database or in a remote server and associate the stored information with a user profile. The information stored may include metadata extracted from the media asset, electronic program guide data, or any other information relating to the media asset. The media guidance application may access the stored information from a user profile. The media guidance application may determine, based on the user profile, a type of advertisement corresponding to at least one media asset of the plurality of media assets viewed by the user. For example, based on the user's history of watching "The Big Bang Theory", the media guidance application may identify the user's interest in situation comedies ("sitcoms") as a type of program, comedy as a genre, and science or "nerd culture" as a subgenre. The media guidance application may analyze the user's history for a certain period of time, such as the last month. The media guidance application may determine the frequency with which each type of program, genre, and subgenre are watched by the user. Based on the frequency, the media guidance application may determine a single program type, genre, or subgenre that appears most often, such as sitcoms. The media guidance application may then identify the type of advertisement as advertisements for sitcoms. The media guidance application may retrieve from the database of advertisements a list of advertisements of the determined type and selecting an advertisement from the list of advertisements. For example, the media guidance application may retrieve a list of advertisements for other sitcoms and select an advertisement for "The IT Crowd".

In some embodiments, the media guidance application may be configured to select an advertisement from the database of advertisements based on a user's social media activity. The media guidance application may determine a social network associated with a user of the media device. For example, the media guidance application may determine from a user profile that the user has a Facebook® account. Alternatively, the media guidance application or the media device on which the media guidance application resides may include a portal through which users may log in to a social media account. The media guidance application may access data related to the portal to determine a social media network the user logs into. The media guidance application may access the social network and determine, based on social network activity of the user, a type of advertisement corresponding to the social network activity of the user. For example, the media guidance application may access the user's Facebook® account, or receive a feed or summary of the user's Facebook® activity, such as a Rich Site Summary ("RSS") feed, including items and messages published and received by the user. Alternatively, the media guidance application may receive push notifications from the social media network and may store content associated with the received notifications. The media guidance application may search the user's activity or stored content associated with social media notifications for terms relating to specific media assets, program series, genres, or products. Based on results of the search, the media guidance application may determine, for example, that the user is interested in a specific product, a specific program series, or a specific genre of media assets. For example, the user's social media activity may contain multiple references to "The Big Bang Theory". The media guidance application may determine from these references that the user is interested in sitcoms, comedies, or "nerd culture". The media guidance application may retrieve a list of advertisements for "The Big Bang Theory" and other sitcoms involving "nerd culture", such as "The IT Crowd". The media guidance application may select one of the advertisements from the list.

In some embodiments, the media guidance application may be configured to insert the selected advertisement into the first media asset at the selected play position by retrieving media data of the selected advertisement and inserting the media data of the selected advertisement into media data of the first media asset at the selected play position. For example, the media guidance application may access the database of advertisements and select the advertisement using an SQL SELECT command. In response to the SELECT command, the database may return the desired advertisement or a URL or other resource locator at which the media guidance application may download the advertisement. Upon downloading the advertisement, the media guidance application may process the media data thereof to extract the video and audio data from the selected advertisement. The media guidance application may copy the video and audio data of the advertisement into the media asset at the selected play position. For example, the media guidance application may shift all media data of the media asset located after the selected play position to a later play position with a temporal distance from its original position corresponding to the duration of the selected advertisement. The media guidance application may then insert the media data of the selected advertisement into the temporal space between the selected play position and the remainder of the media data of the media asset.

In some embodiments, instead of shifting media data of the media asset to accommodate the media data of the selected advertisement, the media guidance application may be configured to insert the selected advertisement into the first media asset by retrieving a pointer to the selected advertisement from the database. For example, the media guidance application may retrieve a URL or other resource locator identifying a specific location from which the selected advertisement can be accessed. The media guidance application may insert the pointer into the first media asset at the selected play position. During playback of the media asset, the pointer may cause the media guidance application to retrieve the selected advertisement from the database, pause playback of the first media asset at the selected play position, begin playback of the selected advertisement, and in response to completing playback of the selected advertisement, resuming playback of the first media asset at the selected play position. For example, upon reaching the pointer, the media guidance application may pause playback of the media asset, and download or stream the advertisement from the database. After playback of the advertisement has finished, the media guidance application may resume playing the media asset from the point at which playback was paused.

In some embodiments, the media guidance application may prevent a user from skipping or fast-forwarding through the inserted advertisement. For example, during playback of the advertisement, the media guidance application may be configured to ignore all user input. Alternatively, the media guidance application may ignore only commands related to the play position of the media asset, while still allowing the user to input other commands, such as changing the volume, or exiting playback of the media asset.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
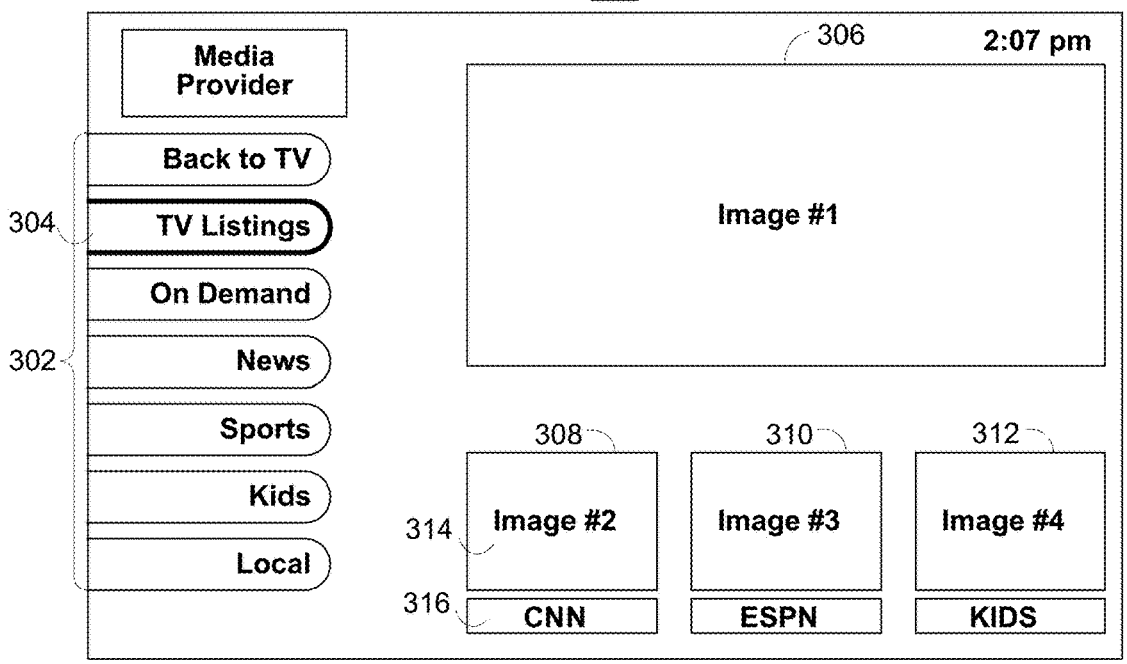
FIG. 3 shows an illustrative display screen that may be used to provide media guidance data according to an embodiment of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows an illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/ or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
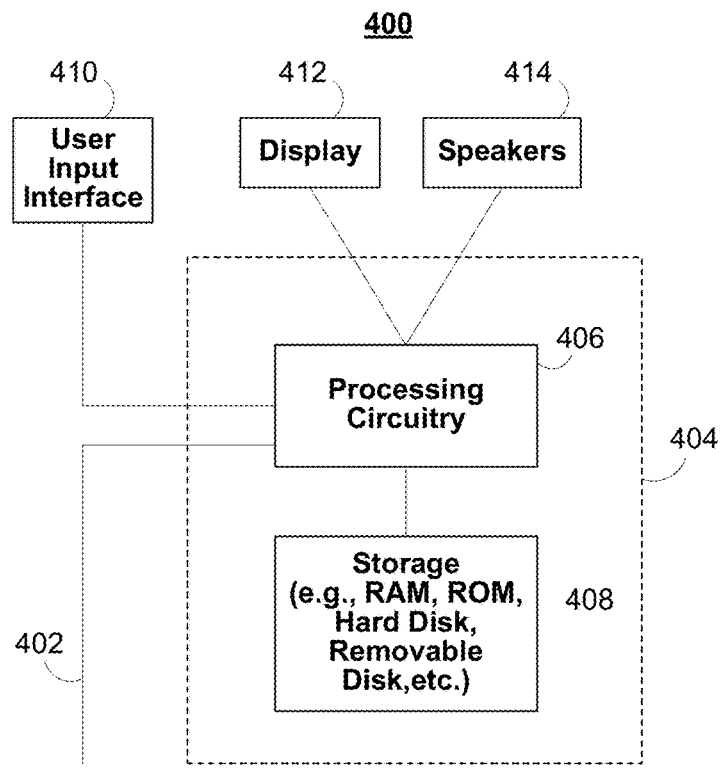
FIG. 4 shows a generalized embodiment of a stand-alone device according to an embodiment of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
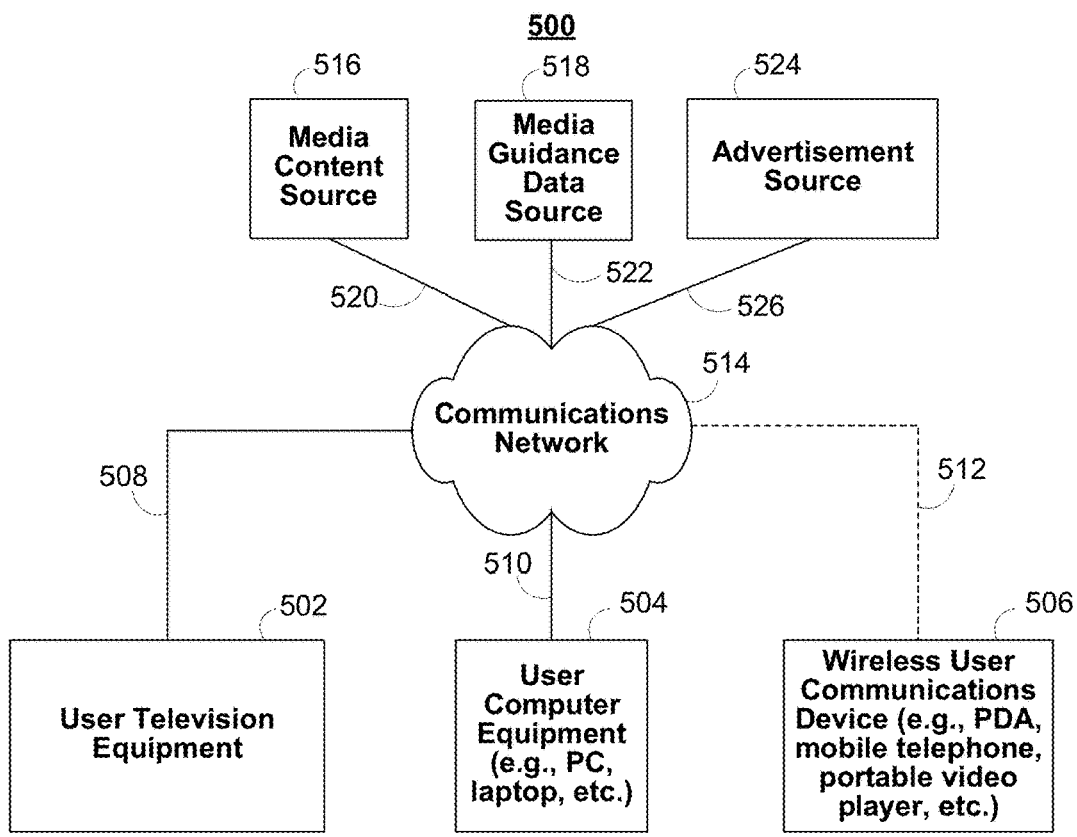
FIG. 5 shows a specific implementation of user devices according to an embodiment of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications networks or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

System 500 may also include an advertisement source 524 coupled to communications network 514 via a communications path 526. Path 526 may include any of the communication paths described above in connection with paths 508, 510, and 512. Advertisement source 524 may include advertisement logic to determine which advertisements to transmit to specific users and under which circumstances. For example, a cable operator may have the right to insert advertisements during specific time slots on specific channels. Thus, advertisement source 524 may transmit advertisements to users during those time slots. As another example, advertisement source may target advertisements based on the demographics of users known to view a particular show (e.g., teenagers viewing a reality show). As yet another example, advertisement source may provide different advertisements depending on the location of the user equipment viewing a media asset (e.g., east coast or west coast).

In some embodiments, advertisement source 524 may be configured to maintain user information including advertisement-suitability scores associated with user in order to provide targeted advertising. Additionally or alternatively, a server associated with advertisement source 524 may be configured to store raw information that may be used to derive advertisement-suitability scores. In some embodiments, advertisement source 524 may transmit a request to another device for the raw information and calculate the advertisement-suitability scores. Advertisement source 524 may update advertisement-suitability scores for specific users (e.g., first subset, second subset, or third subset of users) and transmit an advertisement of the target product to appropriate users.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a standalone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 516 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
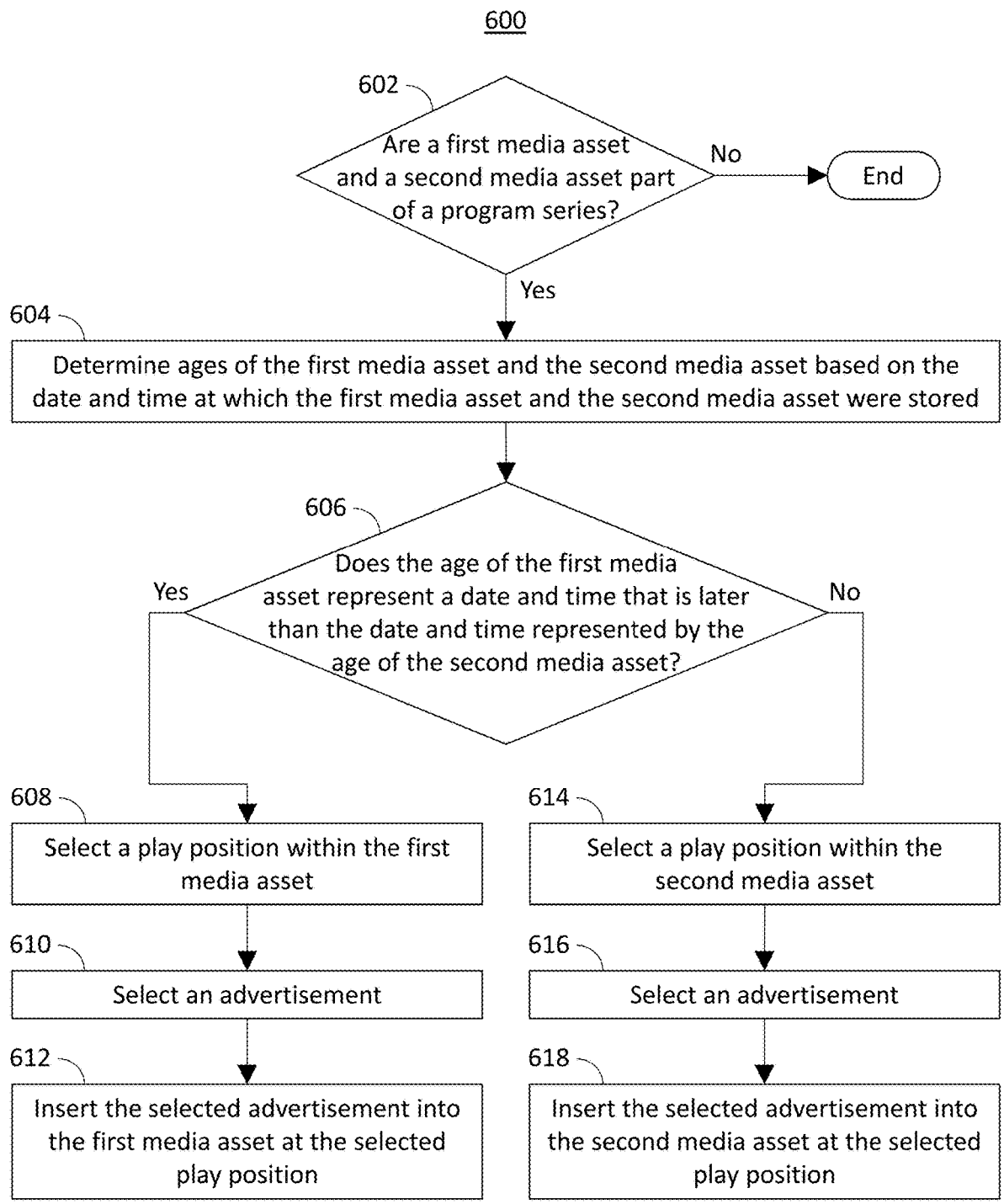
FIG. 6 is a flowchart representing a process for inserting an advertisement into a media asset according to an embodiment of the disclosure.

FIG. 6 is a flowchart representing an illustrative process for inserting an advertisement into a media asset in accordance with some embodiments of the disclosure. The flowchart in FIG. 6 represents a process 600 implemented on control circuitry 404 for inserting an advertisement into a media asset according to an embodiment of the disclosure. It should be noted that process 600 or any action thereof could be performed on, or provided by, any of the devices shown in FIGS. 4-5. For example, process 600 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to insert an advertisement into a media asset. In addition, one or more actions of process 600 may be incorporated into or combined with one or more actions of any other process or embodiment described herein.

At 602, control circuitry 404 may determine if a first media asset and a second media asset that were recorded are part of the same program series. For example, control circuitry 404 may compare metadata of episodes of "The Big Bang Theory" recorded on Jan. 11, 2018 and Jan. 18, 2018 and determine that the metadata relating to the program series are identical for both media assets. For example, control circuitry 404 may compare a character string in a data field related to the program series in the metadata of the first media asset with a character string in a corresponding data field in the metadata of the second media asset. If the character strings are identical, control circuitry 404 may determine that the first media asset and second media asset are part of the same program series.

If the first media asset and the second media asset are part of the same program series then, at 604, control circuitry 404 may determine the ages of the first media asset and the second media asset based on the date and time at which the first media asset and the second media asset were stored. For example, control circuitry 404 may determine that one episode of "The Big Bang Theory" was recorded on Jan. 11, 2018, and the other was recorded on Jan. 18, 2018. Control circuitry 404 may compare the date of the recording with the current date to determine the age, for example, 21 days and 14 days, respectively, of each of the media assets. Alternatively, control circuitry 404 may determine the age of the first media asset and the second media asset by converting the recording date and time to an integer representing the number of seconds that have elapsed since midnight on Jan. 1, 1970, known as "Epoch Time", "POSIX Time", or "Unix Time". Control circuitry 404 may then subtract the Epoch Time integer value representing the recording date and time of the first media asset from the Epoch Time integer value representing the recording date and time of the second media asset. If the resulting integer is positive, control circuitry 404 may determine that the second media asset was recorded at a later date and time than the first media asset. If the resulting integer is negative, control circuitry 404 may determine that the first media asset was recorded at a later date and time than the second media asset.

At 606, control circuitry 404 may determine that the age of the first media asset represents a date and time that is later than the date and time represented by the age of the second media asset. For example, control circuitry 404 may compare the 21-day age of one episode of "The Big Bang Theory" with the 14-day age of another episode of the same series to determine the relative age of the two media assets. Alternatively, control circuitry 404 may use the Epoch Time integer values described above to determine a relative age of the first media asset and the second media asset.

If the age of the first media asset represents a date and time that is later than the date and time represented by the age of the second media asset then, at 608, control circuitry 404 may select a play position within the first media asset. Control circuitry 404 may process the first media asset to identify a plurality of play positions within the first media asset corresponding to boundaries between discrete scenes of the first media asset. For example, control circuitry 404 may access the video data of the first media asset and analyze the data through image processing to identify the first and last frame of each scene in the media asset. Control circuitry 404 may select a play position of the plurality of play positions. For example, control circuitry 404 may select a play position corresponding to the last frame of a scene. Control circuitry 404 may select a scene at random, or may select a scene of relative importance. For example, control circuitry 404 may access a database or metadata indicating the content of each scene and/or the relative importance of each scene in the media asset.

At 610, control circuitry 404 may select an advertisement. Control circuitry 404 may access a database of advertisements. For example, control circuitry 404 may communicate, via network 514, with a remote server such as advertisement source 526, via path 526, to request an advertisement. Alternatively, control circuitry 404 may access a locally-stored database of advertisements, stored in a storage device such as storage 408. Control circuitry 404 may select an advertisement from the database of advertisements having a duration. For example, control circuitry 404 may request an advertisement from the remote server, such as advertisement source 524, or may retrieve an advertisement from the locally-stored database of advertisements.

At 612, control circuitry 404 may insert the selected advertisement into the first media asset at the selected play position. The advertisement may be a certain amount of time in length. Control circuitry 404 may shift media data of the first media asset located after the selected play position to a later play position having a temporal distance corresponding to the duration of the selected advertisement. For example, control circuitry 404 may modify the length of the media asset by adding the length of time of the selected advertisement to the media asset. Control circuitry 404 may then insert the selected advertisement into the first media asset at the selected play position. Alternatively, control circuitry 404 may temporarily remove from the first media asset all media data located after the selected play position and store the media data in a memory buffer. Control circuitry 404 may then insert the selected advertisement into the first media asset at the selected play position, now at the end of the media asset. Control circuitry 404 may then retrieve the media data from the memory buffer and insert it into the first media asset after the advertisement. Alternatively, as will be discussed below, control circuitry 404 may insert a pointer to the selected advertisement instead of the media data of the selected advertisement.

If the age of the second media asset represents a date and time that is later than the date and time represented by the age of the first media asset then, at 614, 616, and 618, control circuitry 404 may perform the actions described above in relation to actions 608, 610, and 612 with the second media asset in place of the first media asset.

In some embodiments, control circuitry 404 may compare the ages of the first media asset and the second media asset with a threshold age. The threshold age may be an integer value or other variable stored in storage 408. For example, the threshold age may be fifteen days. Control circuitry 404 may access the variable representing the threshold from storage 408 and compare the 14-day age of one episode of "The Big Bang Theory" with the threshold. If the age of the first media asset does not exceed the threshold age, control circuitry 404 may not insert advertisement into the first media asset, even if another media asset of the same program series and having an age that is newer than the age of the first media asset. If the age of the first media asset does exceed the threshold, such as the 21-day age of another episode of "The Big Bang Theory", control circuitry 404 may insert an advertisement.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 6.

Figure 7:
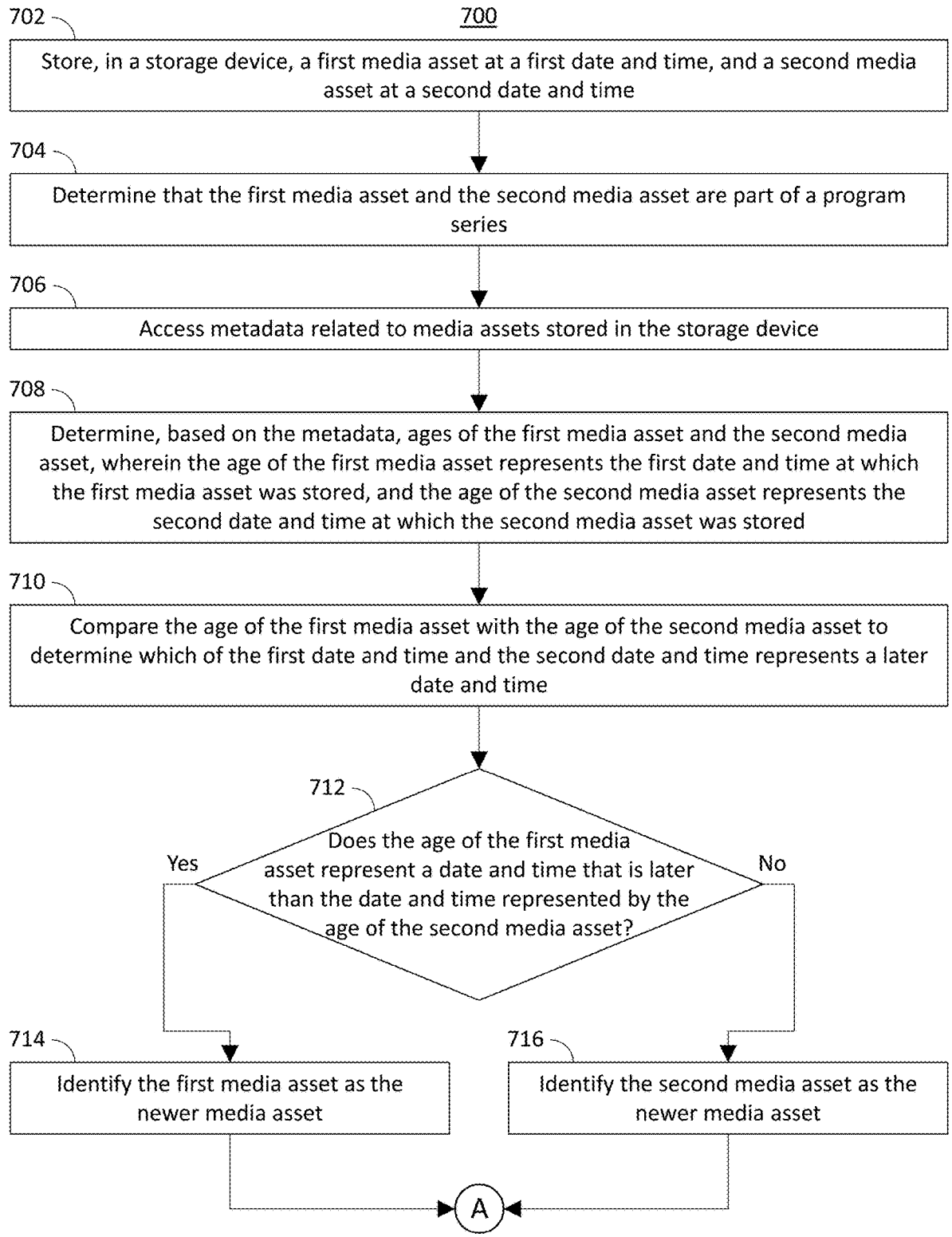
FIG. 7 is a flowchart representing a process for inserting an advertisement into a media asset according to an embodiment of the disclosure.
Figure 7:
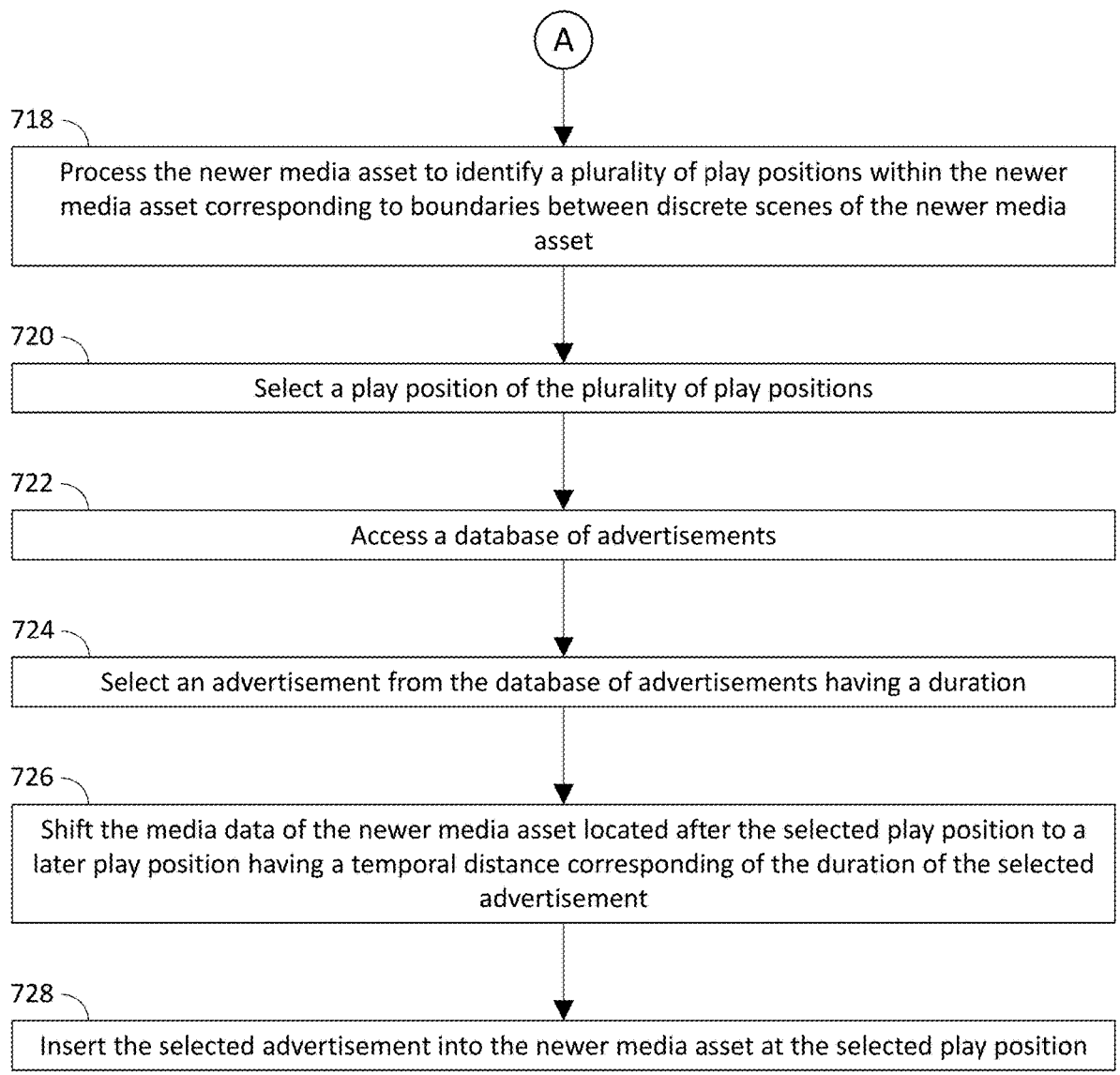

FIG. 7 is a flowchart representing an illustrative process for inserting an advertisement into a media asset in accordance with some embodiments of the disclosure. The flowchart in FIG. 7 represents a process 700 implemented on control circuitry 404 for inserting an advertisement into a media asset according to an embodiment of the disclosure. It should be noted that process 700 or any action thereof could be performed on, or provided by, any of the devices shown in FIGS. 4-5. For example, process 700 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to insert an advertisement into a media asset. In addition, one or more actions of process 700 may be incorporated into or combined with one or more actions of any other process or embodiment described herein.

At 702, control circuitry 404 may store, in a storage device such as storage 408, a first media asset at a first date and time, and a second media asset at a second date and time. For example, control circuitry 404 may record an episode of the program series "The Big Bang Theory" on Jan. 11, 2018, and record another episode of the same program series on Jan. 18, 2018.

At 704, control circuitry 404 may determine that the first media asset and the second media asset are part of a program series. As described above in relation to FIG. 6, control circuitry 404 may compare metadata of episodes of "The Big Bang Theory" recorded on Jan. 11, 2018 and Jan. 18, 2018 and determine that the metadata relating to the program series are identical for both media assets. For example, control circuitry 404 may compare a character string in a data field related to the program series in the metadata of the first media asset with a character string in a corresponding data field in the metadata of the second media asset. The metadata examined by control circuitry 404 may be metadata or EPG data recorded with the media asset at the time of recording, or may be metadata generated by control circuitry 404 for use in managing recorded media assets. If the character strings are identical, control circuitry 404 may determine that the first media asset and second media asset are part of the same program series.

At 706, control circuitry 404 may access metadata related to the media assets stored in the storage device. In addition to storing the media data and metadata of media assets, control circuitry 404 may also generate additional metadata for use in file management. For example, control circuitry 404 may store a record, listing, or database of information describing each recorded media asset stored in storage 408. This metadata may include recording dates and times, file sizes, the source from which the media asset was recorded, and any other information related to the media assets.

At 708, control circuitry 404 may determine, based on the metadata, ages of the first media asset and the second media asset, wherein the age of the first media asset represents the first date and time at which the first media asset was stored, and the age of the second media asset represents the second date and time at which the second media asset was stored. As described above in relation to FIG. 6, control circuitry 404 may determine that one episode of "The Big Bang Theory" was recorded on Jan. 11, 2018, and the other was recorded on Jan. 18, 2018. Control circuitry may extract the date and time at which each episode was recorded from metadata generated by control circuitry 404 at the time of recording for use in managing recorded media assets. Alternatively, control circuitry 404 may extract a unique program identifier from metadata of the media asset. Control circuitry 404 may access EPG data, stored locally in storage 408, or on a remote server such as media guidance data source 518 and retrieve information relating to the identified program to determine the date and time at which the media asset was broadcast, and from which control circuitry 404 may infer the date and time at which the media asset was recorded.

At 710, control circuitry 404 may compare the age of the first media asset with the age of the second media asset to determine which of the first date and time and the second date and time represents a later date. As described above in relation to FIG. 6, control circuitry 404 may compare the date of the recording with the current date to determine the age, for example, 21 days and 14 days, respectively, of each of the media assets. Alternatively, control circuitry 404 may determine the age of the first media asset and the second media asset by converting the recording date and time to an Epoch Time integer value. Control circuitry 404 may then subtract the Epoch Time integer value representing the recording date and time of the first media asset from the Epoch Time integer value representing the recording date and time of the second media asset. If the resulting integer is positive, control circuitry 404 may determine that the second media asset was recorded at a later date and time than the first media asset. If the resulting integer is negative, control circuitry 404 may determine that the first media asset was recorded at a later date and time than the second media asset.

At 712, control circuitry 404 may determine if the age of the first media asset represents a date and time that is later than the date and time represented by the age of the second media asset. As described above in relation to FIG. 6, control circuitry 404 may compare the 21-day age of one episode of "The Big Bang Theory" with the 14-day age of another episode of the same series to determine the relative age of the two media assets. Alternatively, control circuitry 404 may use the Epoch Time integer values described above to determine a relative age of the first media asset and the second media asset.

If the age of the first media asset is determined by control circuitry 404 to represent a date and time that is later than the date and time represented by the age of the second media asset then, at 714, control circuitry 404 may identify the first media asset as being newer than the second media asset. For example, control circuitry 404 may initialize a variable or other data structure identifying the newer media asset. Control circuitry 404 may assign as a value to the variable an identifier of, or pointer to, the first media asset.

If, on the other hand, the age of the second media asset is determined by control circuitry 404 to represent a date and time that is later than the date and time represented by the age of the first media asset then, at 716, control circuitry 404 may identify the second media asset as being newer than the first media asset, and may assign an identifier of, or pointer to, the second media asset to the variable or data structure.

At 718, control circuitry 404 may process the newer media asset to identify a plurality of play positions within the newer media asset corresponding to boundaries between discrete scenes of the newer media asset. For example, control circuitry 404 may access the video data of the newer media asset and analyze the data through image processing to identify the first and last frame of each scene in the media asset. For example, control circuitry 404 may detect a fade-out over a series of frames, followed immediately by a fade-in over a second series of frames. Control circuitry 404 may detect the fade-out and fade-in by, for example, tracking the brightness of successive frames. For example, in the case of a fade-out, the brightness level may decrease over a series of frames according to a known progression, such as a linear progression, wherein each successive frame is reduced in brightness by the same amount, until the frame is completely darkened. In the case of a fade-in, the brightness level may increase from a completely darkened frame to a minimum brightness level over a series of frames. Control circuitry 404 may determine that the frame with the darkest color balance during the fade-out/fade-in sequence is the last frame of a scene. As another example, control circuitry 404 may detect "jump cuts", in which the last frame of a scene is followed immediately by the first frame of another with no transition. Control circuitry 404 may also be configured to access metadata related to the media asset, such as a table of contents or other scene listing, to determine the boundaries between scenes. Control circuitry 404 may store a list of identified play positions in a table, database, or other data structure in storage 408.

At 720, control circuitry 404 may select a play position of the plurality of play positions. For example, control circuitry 404 may access the table, database, or data structure listing the identified play positions. Control circuitry 404 may select a play position at random, using a random number generator. Alternatively, control circuitry 404 may select play positions in sequence, beginning with the first identified play position, or according to a fixed pattern. For example, control circuitry 404 may select the first scene of the media asset, followed by the scene that is temporally closest to the middle of the media asset, and the last scene of the media asset. As yet another alternative, control circuitry 404 may select a scene of relative importance. For example, control circuitry 404 may access a database or metadata indicating the content of each scene and/or the relative importance of each scene in the media asset. Control circuitry 404 may determine whether an advertisement has yet been inserted at a selected play position. If an advertisement has already been inserted at the selected play position, control circuitry 404 may select a different play position.

At 722, control circuitry 404 may access a database of advertisements. For example, control circuitry 404 may communicate with a remote server, such as advertisement source 524, to request an advertisement. Alternatively, control circuitry 404 may access a locally-stored database of advertisements, stored in a storage device such as storage 408. The locally-stored database of advertisements may be updated by advertisement source 524 at regular intervals, such as every 24 hours. Alternatively, the locally-stored database of advertisements may be updated when changes to a user profile indicate an interest in a new type of advertisement. Control circuitry 404 may transmit a request, via communication network 514, to advertisement source 524 to retrieve a set of advertisements of a particular type.

At 724, control circuitry 404 may select an advertisement from the database of advertisements. For example, the media guidance application may request an advertisement from the remote server, or may retrieve an advertisement from the locally-stored database of advertisements. The advertisement may be a certain amount of time in length.

At 726, control circuitry 404 may shift the media data of the newer media asset located after the selected play position to a later play position having a temporal distance from the selected play position corresponding to the duration of the selected advertisement. For example, control circuitry 404 may modify the length of the media asset by adding the length of time of the selected advertisement to the media asset. Control circuitry 404 may then adjust the temporal position of all media data after the selected play position to create a temporal space between the selected play position and the subsequent media data that is equal in length to the length of the selected advertisement. Alternatively, control circuitry 404 may temporarily remove from the first media asset all media data located after the selected play position and store the media data in a memory buffer or in storage 408.

At 728, control circuitry 404 may insert the selected advertisement into the first media asset at the selected play position, filling the temporal space. Alternatively, control circuitry 404 may retrieve the media data from the memory buffer and insert it into the first media asset after the advertisement.

It is contemplated that the actions or descriptions of FIG. 7 may be used with any other embodiment of this disclosure. In addition, the actions and descriptions described in relation to FIG. 7 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 7.

Figure 8:
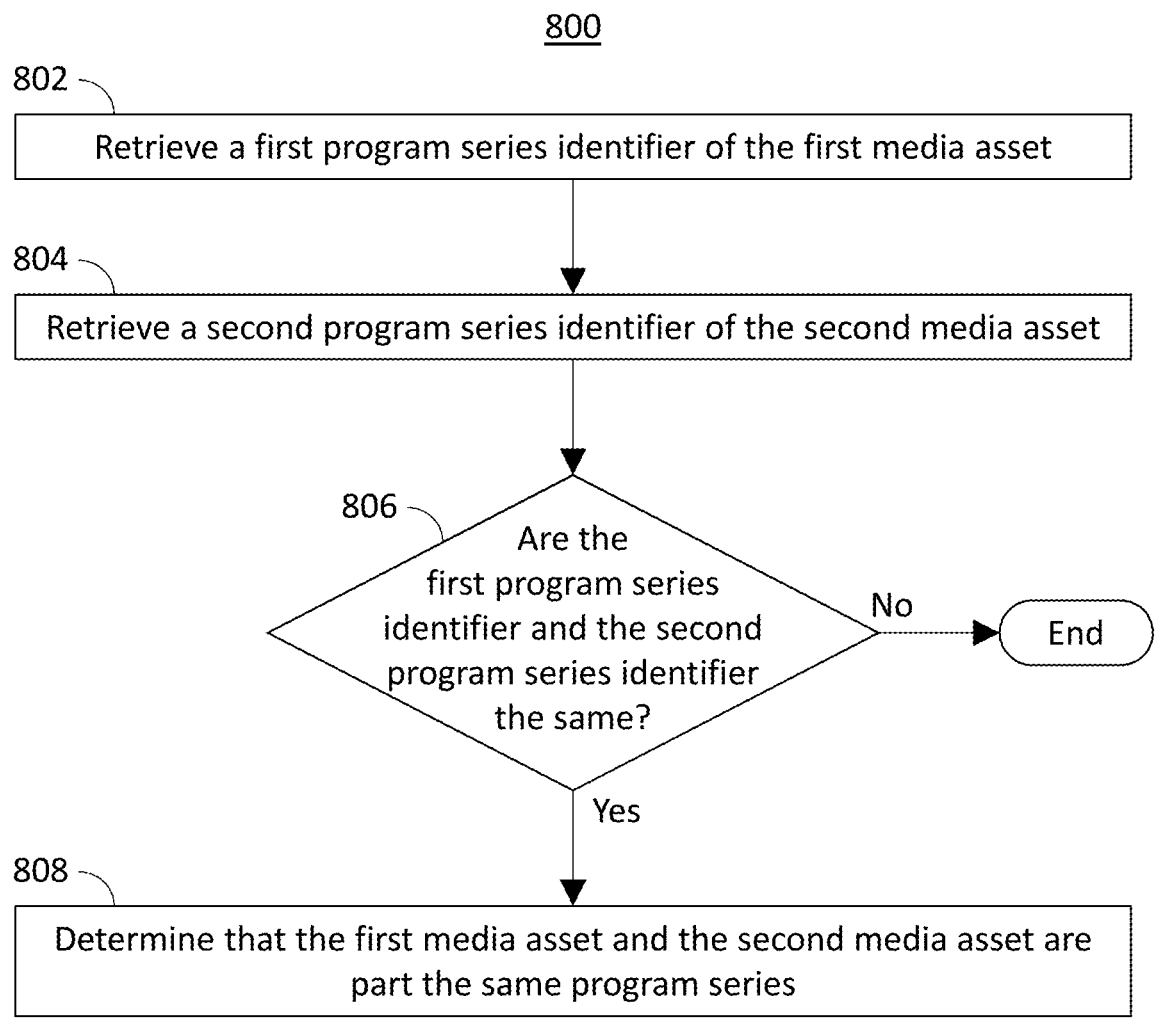
FIG. 8 is a flowchart representing a process for determining that media assets are part of the same program series according to an embodiment of the disclosure.

FIG. 8 is a flowchart representing an illustrative process for determining that media assets are part of the same program series in accordance with some embodiments of the disclosure. The flowchart in FIG. 8 represents a process 800 implemented on control circuitry 404 for determining that media assets are part of the same program series according to an embodiment of the disclosure. It should be noted that process 800 or any action thereof could be performed on, or provided by, any of the devices shown in FIGS. 4-5. For example, process 800 may be executed by control circuitry 404 (FIG. 4) as instructed by a media guidance application implemented on a user device (e.g., user equipment devices 502, 504, and/or 506 (FIG. 5), as well as display screen 100) in order to determine that media assets are part of the same program series. In addition, one or more actions of process 800 may be incorporated into or combined with one or more actions of any other process or embodiment described herein.

At 802, control circuitry 404 may retrieve a first program series identifier of the first media asset. For example, control circuitry 404 may access metadata or other data related to recorded media assets. The metadata may be generated by control circuitry 404 at the time of recording each media asset, or may be copied from EPG data at the time of recording, and may be stored in storage 408 in a table, database, or other data structure. Control circuitry 404 may extract data from the table, database, or data structure, and identify the program series of which each media asset is a part. For example, control circuitry 404 may use an SQL SELECT command to retrieve data related to a single media asset. Control circuitry 404 may access a data field of the metadata indicating the program series of which the media asset is a part.

At 804, control circuitry 404 may retrieve a second program series identifier of the second media asset. This may be accomplished as described above in relation to action 802.

At 806, control circuitry 404 may determine if the first program series identifier and the second program series identifier are the same. For example, control circuitry 404 may use a string comparator, mathematical comparator, or other logical comparator to determine if the program series identified by the metadata of each media asset is the same. Some media assets may identify the program series by an identification code, such as a decimal or hexadecimal number, while some media assets may identify the program series by an alphanumeric string representing the title of the program series, such as "The Big Bang Theory". When comparing the program series identifiers of a media asset which uses an identification code with the program series identifier of a media asset which uses an alphanumeric string, control circuitry 404 may use electronic program guide data or may access a remote media guidance data source, such as media guidance data source 518, to determine the title of the program series which corresponds to the identification code.

If control circuitry 404 determines that the first program series identifier and the second program series identifier are the same then, at 808, control circuitry 404 may determine that the first media asset and the second media asset are part of the same program series.

It is contemplated that the actions or descriptions of FIG. 8 may be used with any other embodiment of this disclosure. In addition, the actions and descriptions described in relation to FIG. 8 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 8.

Figure 9:
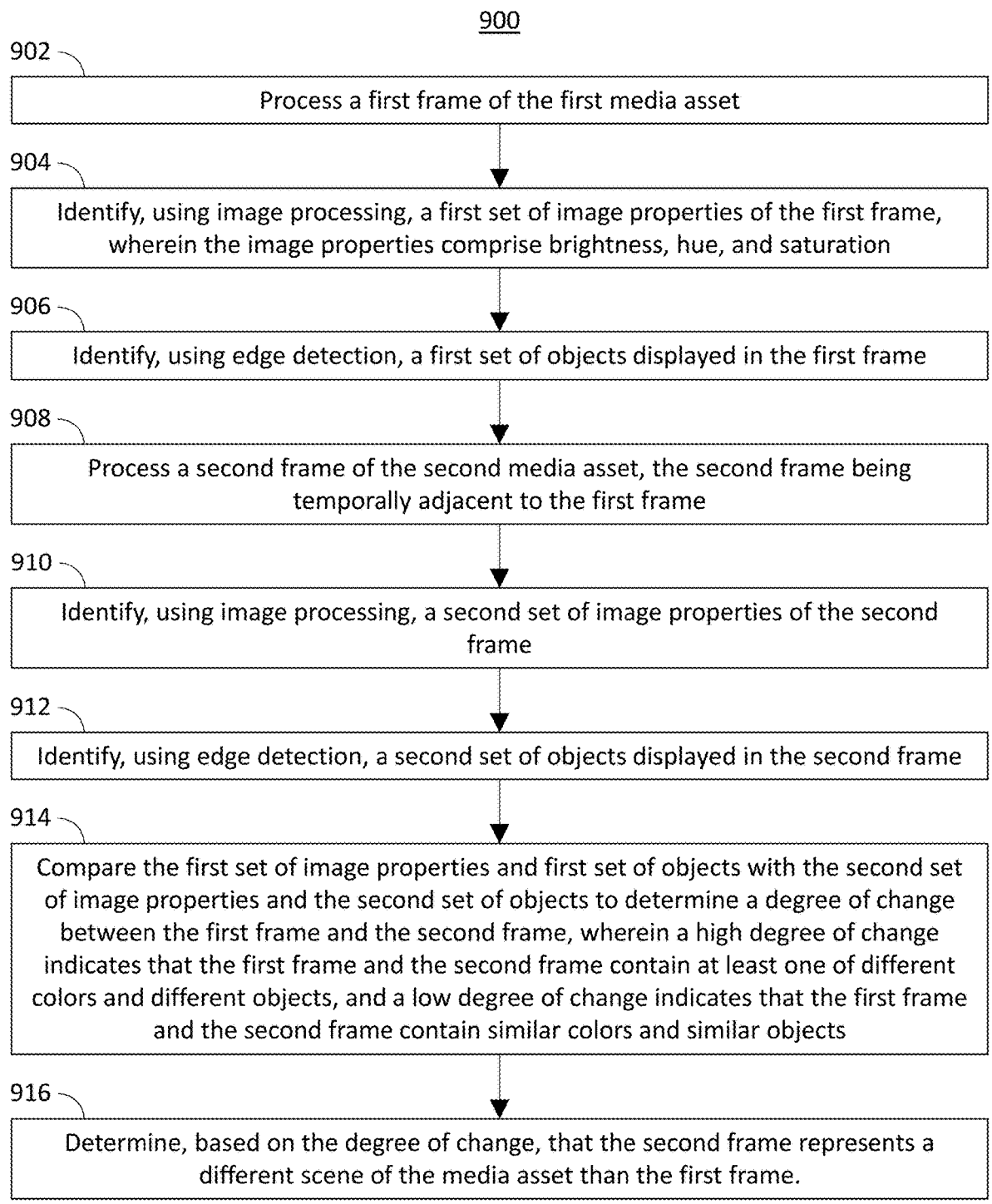
FIG. 9 is a flowchart representing a process for identifying a plurality of play positions within a media asset corresponding to boundaries between discrete scenes of the media asset according to an embodiment of the disclosure.

FIG. 9 is a flowchart representing an illustrative process for identifying a plurality of play positions within a media asset corresponding to boundaries between discrete scenes of the media asset in accordance with some embodiments of the disclosure. The flowchart in FIG. 9 represents a process 900 implemented on control circuitry 404 for identifying a plurality of play positions within a media asset corresponding to boundaries between discrete scenes of the media asset according to an embodiment of the disclosure. It should be noted that process 900 or any action thereof could be performed on, or provided by, any of the devices shown in FIGS. 4- 5. For example, process 900 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to identify a plurality of play positions within a media asset corresponding to boundaries between discrete scenes of the media asset. In addition, one or more actions of process 900 may be incorporated into or combined with one or more actions of any other process or embodiment described herein.

At 902, control circuitry 404 may process a first frame of the first media asset. For example, control circuitry 404 may extract or copy the video data of the first frame for analysis. The media data may be stored in a memory buffer, or in storage 408.

At 904, control circuitry 404 may identify, using image processing, a first set of image properties of one frame and a second set of image properties of an adjacent frame, wherein the image properties comprise brightness, hue, and saturation. For example, control circuitry 404 may analyze the video data of the frame to identify a color of each pixel or group of pixels. Alternatively or additionally, control circuitry 404 may calculate an average color of the entire frame by converting the color of each pixel or group of pixels to a set of decimal or hexadecimal integers corresponding to the levels of red, green, and blue in each pixel or group of pixels. Control circuitry 404 may then take an average of each of the red, green, and blue levels to arrive at an average color of the entire frame.

At 906, control circuitry 404 may identify, using edge detection, a first set of objects displayed in the first frame. For example, control circuitry 404 may identify actors present in the frame, as well as objects, both in the foreground and the background. Control circuitry 404 may store the location of each detected object and the size and shape of the object in a database or other data structure. For example, control circuitry 404 may record an X,Y position of an edge, based on the location of the pixel at which the edge is found, where an X,Y coordinate of 0,0 represents the top-left corner of the frame. Control circuitry 404 may generate a pixel map of the entire detected edge of each object. Control circuitry 404 may also calculate an area occupied by the object, for example, by counting the number of pixels used to display the object.

At 908, control circuitry 404 may process a second frame of the first media asset that is temporally adjacent to the first frame, using the same methods described above with relation to action 902.

At 910, control circuitry 404 may identify, using image processing, a second set of image properties of the second frame, using the same methods described above with relation to action 904.

At 912, control circuitry 404 may identify, using edge detection, a second set of objects in the second frame, using the same methods as described above with relation to action 906.

At 914, control circuitry 404 may compare the first set of image properties with the second set of image properties to determine a degree of change between the first frame and the second frame, wherein a high degree of change indicates that the first frame and the second frame contain at least one of different colors and different objects, and a low degree of change indicates that the first frame and the second frame contain similar colors and similar objects. For example, a frame with the same or similar colors as the previous frame, and the same or similar objects as the previous frame has a low degree of change, while a frame with different colors than the previous frame, and different objects than the previous frame has a high degree of change. Alternatively or additionally, control circuitry 404 may analyze audio data to determine if an individual person's voice continues to be present across play positions indicated by the video data to be scene boundaries. For example, a scene in which two characters carry out a conversation may comprise a series of jump cuts between a camera angle focusing on one individual and a camera angle focusing on the other individual. While analysis of video data may result in each of the jump cuts being marked as a scene boundary, analysis of audio data may show that, despite the abrupt changes in video data, the audio data is consistent across the frames and therefore constitute a continuous scene, lowering the degree of change between the frames.

At 916, control circuitry 404 may determine, based on the degree of change, that the second frame represents a different scene of the media asset than the first frame.

It is contemplated that the actions or descriptions of FIG. 9 may be used with any other embodiment of this disclosure. In addition, the actions and descriptions described in relation to FIG. 9 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 9.

Figure 10:
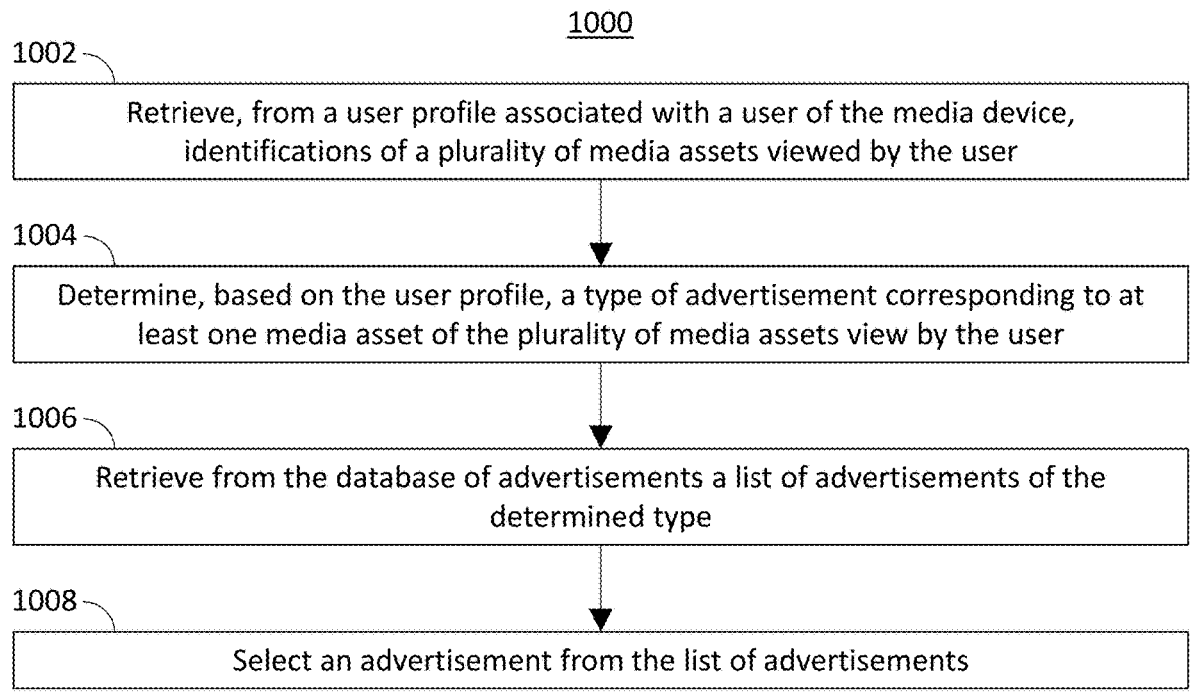
FIG. 10 is a flowchart representing a process for selecting an advertisement from a database of advertisements according to an embodiment of the disclosure.

FIG. 10 is a flowchart representing an illustrative process for selecting an advertisement from a database of advertisements in accordance with some embodiments of the disclosure. The flowchart in FIG. 10 represents a process 1000 implemented on control circuitry 404 for selecting an advertisement from a database of advertisements according to an embodiment of the disclosure. It should be noted that process 1000 or any action thereof could be performed on, or provided by, any of the devices shown in FIGS. 4-5. For example, process 1000 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to select an advertisement from a database of advertisements. In addition, one or more actions of process 1000 may be incorporated into or combined with one or more actions of any other process or embodiment described herein.

At 1002, control circuitry 404 may retrieve, from a user profile associated with a user of the media device, identifications of a plurality of media assets viewed by the user. For example, control circuitry 404 may track media assets watched by the user and store information in a local database or in a remote server and associate the stored information with a user profile. The information stored may include metadata extracted from the media asset, electronic program guide data, or any other information relating to the media asset. Control circuitry 404 may access the stored information from a user profile.

At 1004, control circuitry 404 may determine, based on the user profile, a type of advertisement corresponding to at least one media asset of the plurality of media assets view by the user. For example, based on the user's history of watching "The Big Bang Theory", control circuitry 404 may identify the user's interest in sitcoms as a type of program, comedy as a genre, and science or "nerd culture" as a subgenre. Control circuitry 404 may analyze the user's history for a certain period of time, such as the last month. Control circuitry 404 may determine the frequency with which each type of program, genre, and subgenre are watched by the user. Based on the frequency, control circuitry 404 may determine a single program type, genre, or subgenre that appears most often, such as sitcoms. Control circuitry 404 may then identify the type of advertisement as advertisements for sitcoms.

At 1006, control circuitry 404 may retrieve from the database of advertisements a list of advertisements of the determined type and selecting an advertisement from the list of advertisements. For example, control circuitry 404 may retrieve a list of advertisements for other sitcoms.

At 1008, control circuitry 404 may select an advertisement from the list of advertisement. For example, control circuitry 404 may select an advertisement for "The IT Crowd". This selection may be based on additional information from the user profile, such as genre or subgenre information.

It is contemplated that the actions or descriptions of FIG. 10 may be used with any other embodiment of this disclosure. In addition, the actions and descriptions described in relation to FIG. 10 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 10.

Figure 11:
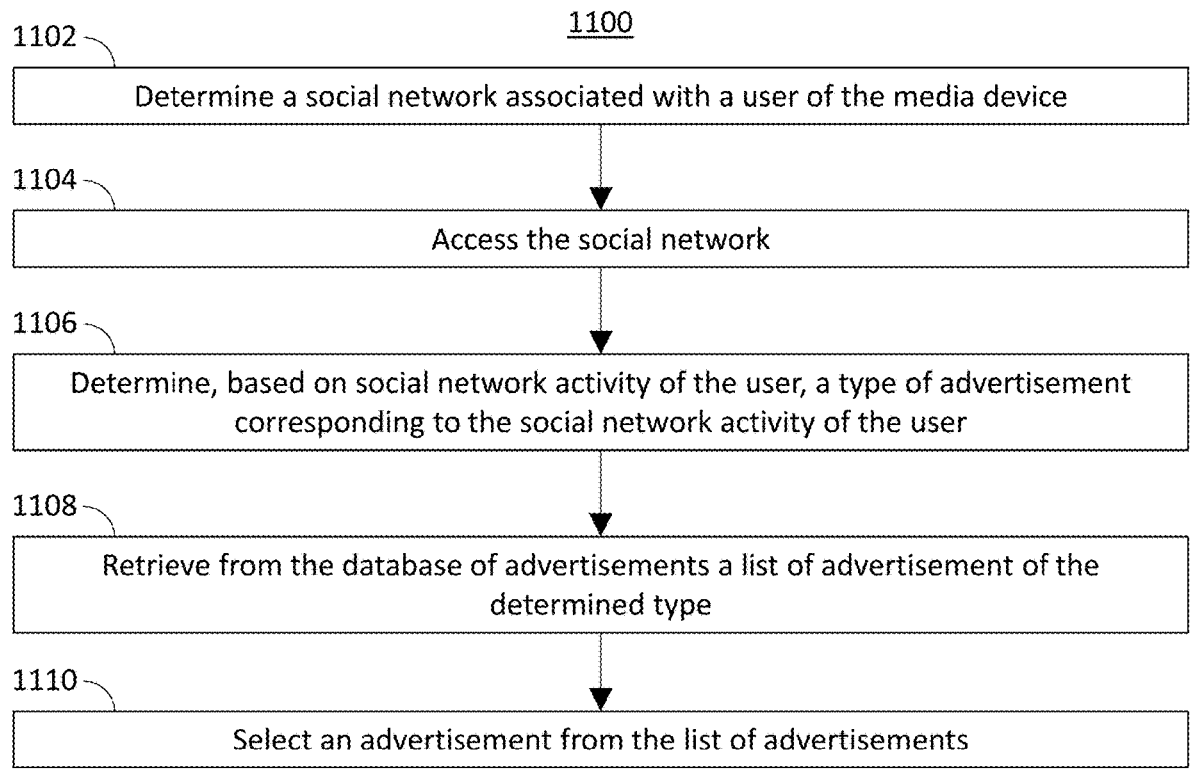
FIG. 11 is a flowchart representing a process for selecting an advertisement from a database of advertisements according to an embodiment of the disclosure.

FIG. 11 is a flowchart representing an illustrative process for selecting an advertisement from a database of advertisements in accordance with some embodiments of the disclosure. The flowchart in FIG. 11 represents a process 1100 implemented on control circuitry 404 for selecting an advertisement from a database of advertisements according to an embodiment of the disclosure. It should be noted that process 1100 or any action thereof could be performed on, or provided by, any of the devices shown in FIGS. 4-5. For example, process 1100 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to select an advertisement from a database of advertisements. In addition, one or more actions of process 1100 may be incorporated into or combined with one or more actions of any other process or embodiment described herein.

At 1102, control circuitry 404 may determine a social network associated with a user of the media device. For example, control circuitry 404 may determine from a user profile that the user has a Facebook® account. Alternatively, control circuitry 404 or the media device on which the media guidance application resides may include a portal through which users may log in to a social network. Control circuitry 404 may access data related to the portal to determine a social network the user logs into.

At 1104, control circuitry 404 may access the social network. For example, control circuitry 404 may access the user's Facebook® account.

At 1106, control circuitry may determine, based on social network activity of the user, a type of advertisement corresponding to the social network activity of the user. For example, control circuitry 404 may access the user's Facebook® activity, or receive a feed or summary of the user's Facebook® activity, such as a Rich Site Summary ("RSS") feed, including items and messages published and received by the user. Alternatively, control circuitry 404 may receive push notifications from the social media network and may store content associated with the received notifications. Control circuitry 404 may search the user's activity or stored content associated with social media notifications for terms relating to specific media assets, program series, genres, or products. Based on results of the search, control circuitry 404 may determine, for example, that the user is interested in a specific product, a specific program series, or a specific genre of media assets. For example, the user's social media activity may contain multiple references to "The Big Bang Theory". Control circuitry 404 may determine from these references that the user is interested in sitcoms, comedies, or "nerd culture".

At 1108, control circuitry 404 may retrieve from the database of advertisements a list of advertisements of the determined type. For example, control circuitry may retrieve a list of advertisements for "The Big Bang Theory" and other sitcoms involving "nerd culture", such as "The IT Crowd".

At 1110, control circuitry 404 may select one of the advertisements from the list. For example, control circuitry 404 may select an advertisement for "The IT Crowd". This selection may be based on additional information from the user profile, such as genre or subgenre information.

It is contemplated that the actions or descriptions of FIG. 11 may be used with any other embodiment of this disclosure. In addition, the actions and descriptions described in relation to FIG. 11 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 11.

Figure 12:
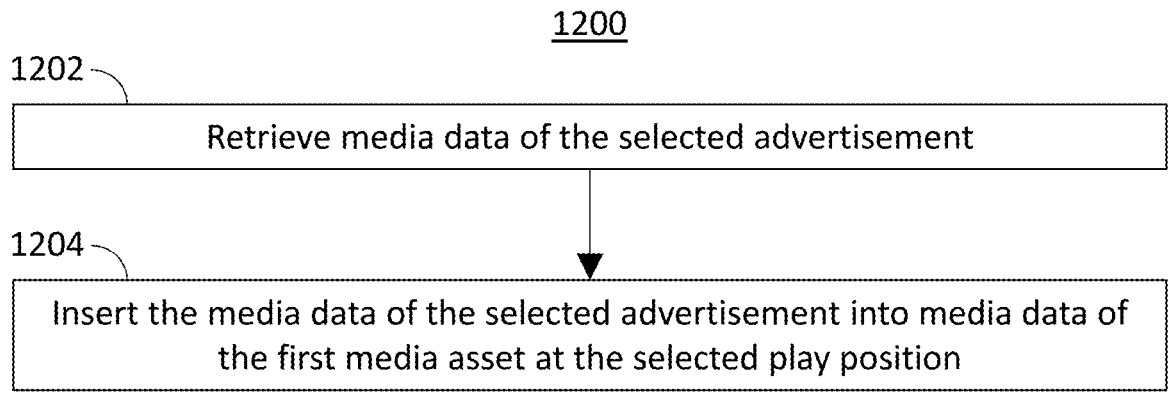
FIG. 12 is a flowchart representing a process for inserting a selected advertisement into a media asset according to an embodiment of the disclosure.

FIG. 12 is a flowchart representing an illustrative process for inserting a selected advertisement into a media asset in accordance with some embodiments of the disclosure. The flowchart in FIG. 12 represents a process 1200 implemented on control circuitry 404 for inserting a selected advertisement into a media asset according to an embodiment of the disclosure. It should be noted that process 1200 or any action thereof could be performed on, or provided by, any of the devices shown in FIGS. 4-5. For example, process 1200 may be executed by control circuitry 404 (FIG. 4) as instructed by a media guidance application implemented on a user device (e.g., user equipment devices 502, 504, and/or 506

(FIG. 5), as well as display screen 100 (FIG. 1)) in order to insert a selected advertisement into a media asset. In addition, one or more actions of process 1200 may be incorporated into or combined with one or more actions of any other process or embodiment described herein.

At 1202, control circuitry 404 may retrieve media data of the selected advertisement. For example, control circuitry 404 may access the database of advertisements and select the advertisement using an SQL SELECT command. In response to the SELECT command, the database may return the desired advertisement or a URL or other resource locator at which the media guidance application may download the advertisement. Upon receiving or downloading the advertisement, control circuitry 404 may process the media data thereof to extract the video and audio data from the selected advertisement.

At 1204, control circuitry 404 may insert the media data of the selected advertisement into media data of the first media asset at the selected play position. For example, control circuitry 404 may copy the video and audio data of the advertisement into the media asset at the selected play position. As described above, the media data of the media asset may be shifted to create a temporal space within the media asset having a length corresponding to the length of the selected advertisement.

It is contemplated that the actions or descriptions of FIG. 12 may be used with any other embodiment of this disclosure. In addition, the actions and descriptions described in relation to FIG. 12 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 12.

Figure 13:
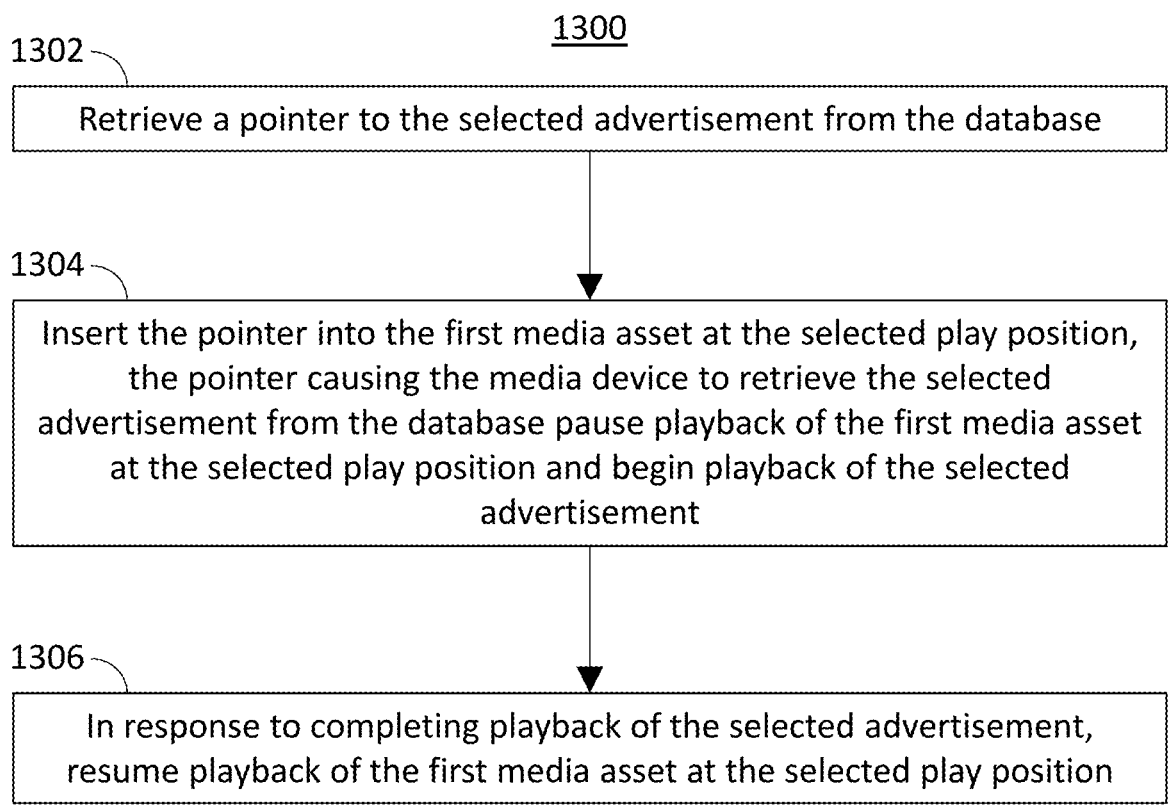
FIG. 13 is a flowchart representing a process for inserting a pointer to a selected advertisement into a media asset according to an embodiment of the disclosure.

FIG. 13 is a flowchart representing an illustrative process for inserting a pointer to a selected advertisement into a media asset in accordance with some embodiments of the disclosure. The flowchart in FIG. 13 represents a process 1300 implemented on control circuitry 404 for inserting a pointer to a selected advertisement into a media asset according to an embodiment of the disclosure. It should be noted that process 1300 or any action thereof could be performed on, or provided by, any of the devices shown in FIGS. 4-5. For example, process 1300 may be executed by control circuitry 404 (FIG. 4) as instructed by a media guidance application implemented on a user device (e.g., user equipment devices 502, 504, and/or 506 (FIG. 5), as well as display screen 100 (FIG. 1)) in order to insert a pointer to a selected advertisement into a media asset. In addition, one or more actions of process 1300 may be incorporated into or combined with one or more actions of any other process or embodiment described herein.

Instead of shifting media data of the media asset to accommodate the media data of the selected advertisement, control circuitry 404 may, at 1302, retrieve a pointer to the selected advertisement from the database of advertisements. For example, control circuitry 404 may retrieve a URL or other resource locator identifying a specific location from which the selected advertisement can be accessed.

At 1304, control circuitry 404 may insert the pointer into the first media asset at the selected play position. During playback of the media asset, the pointer may cause control circuitry 404 to retrieve the selected advertisement from the database, pause playback of the first media asset at the selected play position, begin playback of the selected advertisement.

In response to completing playback of the selected advertisement, at 1306, control circuitry 404 may resume playback of the first media asset at the selected play position. For example, upon reaching the pointer, control circuitry 404 may pause playback of the media asset, and download or stream the advertisement from the database. After playback of the advertisement has finished, control circuitry 404 may resume playing the media asset from the point at which playback was paused.

It is contemplated that the actions or descriptions of FIG. 13 may be used with any other embodiment of this disclosure. In addition, the actions and descriptions described in relation to FIG. 13 may be done in alternative orders or in parallel to further the purposes of this disclosure. For example, each of these actions may be performed in any order or in parallel or substantially simultaneously to reduce lag or increase the speed of the system or method. Any of these actions may also be skipped or omitted from the process. Furthermore, it should be noted that any of the devices or equipment discussed in relation to FIGS. 4-5 could be used to perform one or more of the actions in FIG. 13.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for managing stored media assets, the method comprising:
    storing, in a storage device, a first media asset at a first date and time and a second media asset at a second date and time; and
    prior to receiving a selection to begin playback of the first media asset or the second media asset:
        determining that the first media asset and the second media asset are part of a program series including episodes stored at the first date and time and the second date and time;
        converting the first date and time associated with the first media asset to a first value;
        converting the second date and time associated with the second media asset to a second value;
        determining that the first value is greater than the second value, wherein:
            a value that is greater represents a later date and time;
            the first media asset is a later first media asset stored at the later date and time; and
            the second media asset is an earlier second media asset stored at an earlier date and time; and in response to the determining that the first value is greater, refraining from inserting an advertisement into the earlier second media asset in favor of inserting an advertisement into the later first media asset, wherein:
the refraining comprises, after the advertisement is inserted into the later first media asset, declining to insert any advertisements into the earlier second media asset; and
the advertisement is inserted into the later first media asset by modifying a duration of the later first media asset by adding a length of time corresponding to a duration of the advertisement to the duration of the later first media asset; and
after the advertisement is inserted into the later first media asset:
generating for display, at a media device of a user, a plurality of media asset listings of media assets stored in the storage device, the plurality of media asset listings including a first media asset listing for the first media asset and a second media asset listing for the second media asset;
causing overlay on the first media asset listing of a visual indication notifying the user that the advertisement was inserted into the later first media asset; and
based on the refraining from inserting the advertisement into the earlier second media asset, causing the second media asset listing for the earlier second media asset to be displayed without any overlaid indication related to advertisement insertion.

2. The method of claim 1, wherein the determining that the first media asset and the second media asset are part of the program series comprises:
retrieving a first program series identifier of the first media asset;
retrieving a second program series identifier of the second media asset; and
comparing the first program series identifier and the second program series identifier to determine if the first media asset and the second media asset are part of a same program series.

3. The method of claim 1, further comprising:
processing the later first media asset to identify a plurality of play positions within the later first media asset corresponding to boundaries between discrete scenes of the later first media asset; and
selecting a play position of the plurality of play positions at which to insert the advertisement.

4. The method of claim 1, further comprising:
retrieving, from a user profile associated with a user, identifications of a plurality of media assets viewed by the user;
determining, based on the user profile, a type of advertisement corresponding to at least one media asset of the plurality of media assets viewed by the user;
retrieving from a database of advertisements a list of advertisements of the determined type; and
selecting an advertisement for insertion into the later first media asset from the list of advertisements.

5. The method of claim 1, further comprising:
determining a social network associated with a user;
accessing the social network;
determining, based on social network activity of the user, a type of advertisement corresponding to the social network activity of the user;
retrieving from a database of advertisements a list of advertisement of the determined type; and
selecting an advertisement for insertion into the later first media asset from the list of advertisements, wherein:
the social network activity is a message received by the user from another user of the social network; and
determining, based on social network activity of the user, a type of advertisement corresponding to the social network activity of the user comprises processing the message for content related to a type of advertisement.

6. The method of claim 1, wherein:
the converting the first date and time associated with the first media asset to the first value and the converting the second date and time associated with the second media asset to the second value are based on a reference date and time; and
the reference date and time are Jan. 1, 1970, and midnight, respectively.

7. The method of claim 3, wherein the inserting the advertisement into the later first media asset comprises:
retrieving media data of the advertisement; and
inserting the media data of the advertisement into media data of the later first media asset at the selected play position.

8. The method of claim 3, further comprising inserting a second advertisement into the later first media asset by:
selecting a second play position of the later first media asset;
selecting the second advertisement from a database of advertisements;
retrieving a pointer to the selected second advertisement from the database; and
associating the pointer with the selected second play position of the later first media asset, the pointer causing, during playback of the later first media asset by a media device, the media device to:
retrieve the selected second advertisement from the database;
pause playback of the later first media asset at the selected second play position;
begin playback of the selected second advertisement; and
in response to completing playback of the selected second advertisement, resuming playback of the later first media asset at the selected second play position.

9. The method of claim 1, wherein advertisements have not been inserted into the later first media asset and advertisements have not been inserted into the earlier second media assets prior to the inserting the advertisement into the later first media asset.

10. The method of claim 1, further comprising:
determining whether a number of days between a current date and the second date associated with the earlier second media asset exceeds a threshold number of days; and
wherein inserting the advertisement into the later first media asset is further performed based on determining that the number of days between the current date and the second date associated with the earlier second media asset exceeds the threshold number of days.

11. A system for managing stored media assets, the system comprising:
control circuitry configured to:
store in a storage device, a first media asset at a first date and time and a second media asset at a second date and time; and prior to receiving a selection to begin playback of the first media asset or the second media asset:
  determining that the first media asset and the second media asset are part of a program series including episodes stored at the first date and time and the second date and time;
  convert the first date and time associated with the first media asset to a first value;
  convert the second date and time associated with the second media asset to a second value;
  determine which of the first value and the second value is greater, wherein a value that is greater represents a later date and time, wherein the first media asset is a later first media asset stored at the later date and time, and wherein the second media asset is an earlier second media asset stored at an earlier date and time; and
  in response to the determining that the first value is greater, refrain from inserting an advertisement into the earlier second media asset in favor of inserting an advertisement into the later first media asset, wherein:
    the refraining comprises, after the advertisement is inserted into the later first media asset, declining to insert any advertisements into the earlier second media asset; and
    the advertisement is inserted into the later first media asset by modifying a duration of the later first media asset by adding a length of time corresponding to a duration of the advertisement to the duration of the later first media asset; and
  after the advertisement is inserted into the later first media asset:
    generate for display, at a media device of a user, a plurality of media asset listings of media assets stored in the storage device, the plurality of media asset listings including a first media asset listing for the first media asset and a second media asset listing for the second media asset;
    cause overlay on the first media asset listing of a visual indication notifying the user that the advertisement was inserted into the later first media asset; and
    based on the refraining from inserting the advertisement into the earlier second media asset, cause the second media asset listing for the earlier second media asset to be displayed without any overlaid indication related to advertisement insertion.

12. The system of claim 11, wherein the control circuitry configured to determine that the first media asset and the second media asset are part of the program series is further configured to:
  retrieve a first program series identifier of the first media asset;
  retrieve a second program series identifier of the second media asset; and
  compare the first program series identifier and the second program series identifier to determine if the first media asset and the second media asset are part of a same program series.

13. The system of claim 11, wherein the control circuitry is further configured to:
  process the later first media asset to identify a plurality of play positions within the later first media asset corresponding to boundaries between discrete scenes of the later first media asset; and
  select a play position of the plurality of play positions at which to insert the advertisement.

14. The system of claim 11, wherein the control circuitry is further configured to:
  retrieve, from a user profile associated with a user, identifications of a plurality of media assets viewed by the user;
  determine, based on the user profile, a type of advertisement corresponding to at least one media asset of the plurality of media assets viewed by the user;
  retrieve from a database of advertisements a list of advertisements of the determined type; and
  select an advertisement for insertion into the later first media asset from the list of advertisements.

15. The system of claim 11, wherein the control circuitry is further configured to:
  determine a social network associated with a user;
  access the social network;
  determine, based on social network activity of the user, a type of advertisement corresponding to the social network activity of the user;
  retrieve from a database of advertisements a list of advertisement of the determined type; and
  select an advertisement for insertion into the later first media asset from the list of advertisements, wherein
  the social network activity is a message received by the user from another user of the social network; and
  the control circuitry configured to determine, based on social network activity of the user, a type of advertisement corresponding to the social network activity of the user is further configured to process the message for content related to a type of advertisement.

16. The system of claim 13, wherein the control circuitry configured to insert the advertisement into the later first media asset at the selected play position is further configured to:
  retrieve media data of the advertisement; and
  insert the media data of the advertisement into media data of the later first media asset at the selected play position.

17. The system of claim 13, wherein the control circuitry is further configured to insert a second advertisement into the later first media asset by:
  selecting a second play position of the later first media asset;
  selecting the second advertisement from a database of advertisements;
  retrieving a pointer to the selected second advertisement from the database; and
  associating the pointer with the selected second play position of the later first media asset, the pointer causing, during playback of the later first media asset by a media device, the media device to:
    retrieve the selected second advertisement from the database;
    pause playback of the later first media asset at the selected second play position;
    begin playback of the selected second advertisement; and
    in response to completing playback of the selected second advertisement, resuming playback of the later first media asset at the selected second play position.

18. A method for managing stored media assets, the method comprising:
- storing, in a storage device, a first media asset at a first date and time and a second media asset at a second date and time; and
- prior to receiving a selection to begin playback of the first media asset or the second media asset:
  - determining that the first media asset and the second media asset are part of a program series including episodes stored at the first date and time and the second date and time;
  - converting the first date and time associated with the first media asset to a first value;
  - converting the second date and time associated with the second media asset to a second value;
  - determining that the first value is not greater than the second value, wherein:
    - a value that is greater represents a later date and time;
    - the first media asset is an earlier first media asset stored at an earlier date and time; and
    - the second media asset is a later second media asset stored at the later date and time; and
  - in response to the determining that the first value is not greater, refraining from inserting an advertisement into the earlier first media asset in favor of inserting an advertisement into the later second media asset, wherein:
    - the refraining comprises, after the advertisement is inserted into the later second media asset, declining to insert any advertisements into the earlier first media asset; and
    - the advertisement is inserted into the later second media asset by modifying a duration of the later second media asset by adding a length of time corresponding to a duration of the advertisement to the duration of the later second media asset; and
  - after the advertisement is inserted into the later second media asset:
    - generating for display, at a media device of a user, a plurality of media asset listings of media assets stored in the storage device, the plurality of media asset listings including a first media asset listing for the first media asset and a second media asset listing for the second media asset;
    - causing overlay on the second media asset listing of a visual indication notifying the user that the advertisement was inserted into the later second media asset; and
    - based on the refraining from inserting the advertisement into the earlier first media asset, causing the first media asset listing for the earlier first media asset to be displayed without any overlaid indication related to advertisement insertion.

* * * * *